United States Patent
Nakakura et al.

(10) Patent No.: US 9,505,463 B2
(45) Date of Patent: Nov. 29, 2016

(54) BICYCLE CONTROL DEVICE

(71) Applicant: Shimano Inc., Sakai, Osaka (JP)

(72) Inventors: Masahiro Nakakura, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 218 days.

(21) Appl. No.: 14/094,736

(22) Filed: Dec. 2, 2013

(65) Prior Publication Data

US 2014/0174236 A1    Jun. 26, 2014

(30) Foreign Application Priority Data

Dec. 26, 2012 (JP) .............................. 2012-007809 U

(51) Int. Cl.
| | |
|---|---|
| B62K 25/02 | (2006.01) |
| F16C 1/10 | (2006.01) |
| B62M 25/08 | (2006.01) |
| B62L 3/02 | (2006.01) |
| B62M 25/04 | (2006.01) |
| B62K 23/06 | (2006.01) |

(52) U.S. Cl.
CPC .............. B62M 25/08 (2013.01); B62K 23/06 (2013.01); B62L 3/023 (2013.01); B62M 25/04 (2013.01); *Y10T 74/20043* (2015.01)

(58) Field of Classification Search
CPC ......... B62L 3/02; B62L 3/023; B62K 23/06; B62M 25/04
See application file for complete search history.

(56) References Cited

U.S. PATENT DOCUMENTS

| | | | |
|---|---|---|---|
| 4,175,648 A | 11/1979 | Sule | |
| 4,391,353 A | 7/1983 | Mathauser | |
| 4,635,442 A * | 1/1987 | Bass | B62L 3/023 188/344 |
| 4,665,803 A | 5/1987 | Mathauser | |
| 4,779,482 A * | 10/1988 | Kawaguchi | B62K 23/02 188/196 BA |
| 4,921,081 A | 5/1990 | Chilcote | |
| 5,813,501 A | 9/1998 | Terry, Sr. | |
| 6,003,639 A | 12/1999 | Buckley et al. | |
| 7,540,147 B2 | 6/2009 | Takizawa et al. | |
| 7,650,813 B2 | 1/2010 | Tsumiyama | |
| 8,201,670 B2 | 6/2012 | Tetsuka et al. | |

(Continued)

FOREIGN PATENT DOCUMENTS

| | | |
|---|---|---|
| CN | 101631706 A | 1/2010 |
| EP | 2308750 A1 | 4/2011 |

(Continued)

OTHER PUBLICATIONS

European Search Report of corresponding EP Application No. 13 19 8135.9 dated Apr. 28, 2014.

*Primary Examiner* — William Kelleher
*Assistant Examiner* — Jake Cook
(74) *Attorney, Agent, or Firm* — Global IP Counselors

(57) ABSTRACT

A bicycle control device includes a housing member, a control lever member, a shift-operating mechanism and a hydraulic fluid pressure generator. The housing member has an attachment part for attachment to a handlebar, and a grip part extending longitudinally between first and second ends of the grip part. The control lever member pivots relative to the housing member. The shift-operating mechanism is coupled to a shifting device by a control cable. The hydraulic fluid pressure generator has a cylinder, a piston movably disposed within the cylinder by movement of control lever member to generate fluid pressure for controlling a braking device, a piston position adjustment mechanism adjustably coupling the piston with respect to the cylinder to change an initial position of the piston with respect to the cylinder.

17 Claims, 17 Drawing Sheets

(56) References Cited

U.S. PATENT DOCUMENTS

| | | |
|---|---|---|
| 8,464,844 B2 | 6/2013 | Jordan |
| 2005/0097979 A1* | 5/2005 | Nago .................. B60T 11/046 74/502.2 |
| 2012/0067043 A1* | 3/2012 | Becocci ................ B60T 11/22 60/585 |
| 2012/0160625 A1* | 6/2012 | Jordan .................. B60T 7/102 188/344 |
| 2012/0222416 A1* | 9/2012 | Hirose .................. B62L 3/023 60/594 |
| 2012/0240715 A1 | 9/2012 | Tsai |
| 2013/0255239 A1 | 10/2013 | Miki |

FOREIGN PATENT DOCUMENTS

| | | |
|---|---|---|
| WO | 03/047954 A1 | 6/2003 |
| WO | 2007025984 A1 | 3/2007 |

* cited by examiner

BICYCLE CONTROL DEVICE

CROSS-REFERENCE TO RELATED APPLICATIONS

This application claims priority under 35 U.S.C. §119 to Japanese Patent Application No. 2012-007809, filed Dec. 26, 2012. The entire disclosure of Japanese Patent Application No. 2012-007809 is hereby incorporated herein by reference.

BACKGROUND

Field of the Invention

This invention generally relates to a bicycle control device. More specifically, the present invention relates to a bicycle control device which can be mounted on the handlebar of a bicycle and which can control a braking device and a shifting device.

Background Information

Bicycle control devices are conventionally known, which can be mounted on a handlebar of a bicycle for controlling both a braking device and a shifting device (for example, see European Patent Application Publication No. 2308750). This prior art bicycle control device is provided with a housing member having an attachment part capable of being attached to a handlebar and a grip part capable of being gripped by a rider by hand, a control lever member having a first operating lever and a second operating lever, and a shift-operating mechanism provided on a first end side (the handlebar side) of the grip part. In the bicycle control device disclosed in European Patent Application Publication No. 2308750, the shift-operating mechanism is provided at the first end of the grip part, which extends in the longitudinal direction, allowing the control lever member to be more compact.

Bicycle control devices are also known in the prior art that perform a braking operation on a bicycle using hydraulic pressure (for example, see Chinese Patent Publication No. M386235). The bicycle control device is typically provided on the handlebar. This bicycle control device includes a hydraulic fluid pressure generator that is disposed in grip part. The distal end of a rod part of the hydraulic fluid pressure generator is pivotally coupled to a control lever member. The control device of Chinese Patent Publication No. M386235 is also provided with a piston position adjustment mechanism for adjusting an initial position of the piston. The piston position adjustment mechanism has a pivoting hinge member engaging the piston, and a screw member for pivoting the hinge member. The pivot angle of the hinge member is changed by advancing and retracting of the screw. Through this change in the pivot angle, the position at which the piston is regulated by the hinge member changes along the axial direction of the cylinder.

SUMMARY

Generally, it is possible that the hydraulic fluid pressure generator of Chinese Patent Publication No. M386235, which includes piston position adjustment mechanism to adjust an initial position of the piston, could be applied to the bicycle control device of European Patent Application Publication No. 2308750, which is capable of controlling a braking device and a shifting device, to arrive at a configuration for a bicycle control device for performing shift operations and braking operations, in which the initial position of the piston is adjustable. In the bicycle control device of European Patent Application Publication No. 2308750, however, the shift-operating mechanism is provided inside the grip section of the housing member. For this reason, if a hydraulic fluid pressure generator having the piston initial position adjustment mechanism of Chinese Patent Publication No. M386235 in the grip portion were provided, the grip portion would be larger in size, making it difficult for the rider to grip the grip part. When the grip part of the housing member is difficult to grip, it becomes difficult for the rider to operate the control lever member.

One object of the present invention is to provide a bicycle control device that facilitates operation of the control lever member by the rider for performing shift operations and braking operations, and that has a shift-operating mechanism in the grip part, even when a hydraulic fluid pressure generator having a piston position adjustment mechanism has been provided inside the grip part.

In view of the state of the known technology and in accordance with a first aspect of the present disclosure, a bicycle control device is provided that is capable of being mounted on the handlebar of a bicycle and capable of controlling a braking device and a shifting device. The bicycle control device comprises a housing member, a control lever member, a shift-operating mechanism and a hydraulic fluid pressure generator. The housing member has an attachment part for attachment to a handlebar, and a grip part extending longitudinally between first and second ends of the grip part. The attachment part is provided on the first end of the grip part. The control lever member is pivotally provided with respect to the housing member. The shift-operating mechanism is provided in the housing member. The shift-operating mechanism is configured to be coupled to a shifting device by a control cable. The hydraulic fluid pressure generator has a cylinder, a piston movably disposed within the cylinder by movement of the control lever member to generate fluid pressure for controlling a braking device, a piston position adjustment mechanism adjustably coupling the piston with respect to the cylinder to change an initial position of the piston with respect to the cylinder.

In this bicycle control device, the shifting device is operated via the control cable when the grip part of the housing member is gripped and the control lever member is operated, actuating the shift-operating mechanism. The braking device is controlled by hydraulic pressure generated when the piston of the hydraulic fluid pressure generator is displaced through actuation of the control lever member. The initial position of the piston can be adjusted by the piston position adjustment mechanism. Herein, the cylinder of the hydraulic fluid pressure generator is provided to the housing member, and is disposed toward a second end side relative to the shift-operating mechanism. Because the hydraulic fluid pressure generator is disposed at a second end side relative to the shift-operating mechanism in this manner, the shift-operating mechanism, and the hydraulic fluid pressure generator having the piston position adjustment mechanism do not overlap in the longitudinal direction. Therefore, the first end side of the grip part can be narrower, making it easy for the rider to grip the grip part, even when the hydraulic fluid pressure generator having the piston position adjustment mechanism is provided to the grip part. It is therefore easier for the rider to operate the control lever member.

In accordance with a second aspect, the bicycle control device according to the first aspect is configured so that the hydraulic fluid pressure generator has a rod part coupled to the piston, and operated by the control lever member. The control lever member has a first operating lever, and a cam member for pivoting about a first axis in conjunction with pivoting of the first operating lever, and actuating the rod part. The piston position adjustment mechanism has a first adjustment member coupled to the cam member for adjusting the initial position of the cam member. In this aspect, the initial position of the piston can be adjusted through modification of the initial position of the cam member In accordance with a third aspect, the bicycle control device according to the second aspect is configured so that the first adjustment member has a first adjustment bolt disposed along a second axis intersecting with the first axis. In this aspect, by disposing the first adjustment bolt along the second axis, the control lever member and the cam member can be easily coupled. Moreover, the phase of the cam member and the control level member in the pivoting direction can be changed through rotation of the first adjustment bolt. In so doing, an arrangement for coupling the cam member to the control level member, and an arrangement for modifying the initial position of the cam member, can be realized using a single adjustment bolt.

In accordance with a fourth aspect, the bicycle control device according to the second or third aspect is configured so that the first adjustment member has a second adjustment bolt provided in proximity to the first axis. In this aspect, because the adjustment bolt is provided in proximity to the first axis of either the control lever member or the cam member, and contacts the other, the phase of the cam member in the pivoting direction can be changed by advance and retreat of the second adjustment bolt through rotation thereof. In so doing, an arrangement for pivoting the cam member by pivoting the control lever member, and an arrangement for modifying the initial position of the cam member can be realized using a single adjustment bolt.

In accordance with a fifth aspect, the bicycle control device according to any of the second to fourth aspects is configured so that the first adjustment member has a worm gear bolt that is provided to one of the first operating lever part and the cam member, and that is configured to engage the other of the first operating lever part and the cam member. In this aspect, the phase of the cam member and the control level member in the pivoting direction can be changed by rotating the worm gear bolt. In so doing, an arrangement for pivoting the cam member by pivoting the control lever member, and an arrangement for modifying the initial position of the cam member can be realized using a single adjustment bolt.

The first adjustment member may independently have the first adjustment bolt, the second adjustment bolt, or the worm gear bolt, respectively, and it is also possible to have some combination of a plurality of the respective bolts, in which case fine adjustments would be possible through respective adjustment of each.

In accordance with a sixth aspect, the bicycle control device according to the first aspect is configured on that the piston position adjustment mechanism has a second adjustment member for coupling the control lever member and the piston, and the second adjustment member being configured to adjust a position of the control lever member relative to the piston. In this aspect, the initial position of the piston can be adjusted irrespectively of the position of the control lever member.

In accordance with a seventh aspect, the bicycle control device according to the sixth aspect is configured so that the hydraulic fluid pressure generator has a rod part coupled to the piston, and operated by the control lever member. The second adjustment member has an adjustment screw that adjusts an effective length of the rod part. In this aspect, the initial position of the piston can be modified by adjusting the length of the rod part through turning of the adjustment screw. Therefore, the initial position of the piston can be adjusted through a simple arrangement involving the adjustment screw.

A bicycle control device according to an eighth aspect of the present invention is a bicycle control device capable of being mounted on a handlebar of a bicycle and capable of controlling a braking device and a shifting device. The bicycle control device comprises a housing member, a control lever member, a shift-operating mechanism, a hydraulic fluid pressure generator and a control lever position adjustment mechanism. The housing member has an attachment part for attachment to a handlebar, and a grip part extending longitudinally between first and second ends of the grip part. The attachment part is provided on the first end of the grip part. The control lever member is pivotally provided with respect to the housing member. The shift-operating mechanism is provided in the housing member. The shift-operating mechanism is configured to be coupled to a shifting device by a control cable. The hydraulic fluid pressure generator has a cylinder provided in the housing member, a piston movably disposed within the cylinder by movement of the control lever member to generate fluid pressure for controlling a braking device. The cylinder is disposed in the housing member at a position closer toward the second end of the grip part than is the shift-operating mechanism to the second end of the grip part. The control lever position adjustment mechanism is adjustably coupling the control lever member with respect to the housing member to change an initial position of the control lever member with respect to the housing member.

In this eighth aspect, the shifting device is operated via the control cable, by gripping the grip part of the housing member, and operating the control lever member to actuate the shift-operating mechanism. The braking device is controlled by hydraulic pressure generated by displacement of the piston of the hydraulic pressure-generating part through operation of the control lever member. Moreover, the initial position of the control lever member can be adjusted through the control lever position adjustment mechanism. Herein, the cylinder of the hydraulic pressure-generating part is provided to the housing member, and disposed closer to the second end side relative to the shift-operating mechanism. Thus, since the hydraulic pressure-generating part is disposed closer to the second end relative to the shift-operating mechanism, the hydraulic pressure-generating part and the shift-operating mechanism do not overlap in the longitudinal direction, despite the provision of the control lever position adjustment mechanism. Therefore, the first end side of the grip part can be narrower, and moreover the initial position (grip width) of the control lever is adjustable, making it easy for a rider, even one with relatively small hands, to grip the grip part, and easier for the rider to operate the control lever member.

In accordance with a ninth aspect, the bicycle control device according to the eighth aspect is configured so that the control lever position adjustment mechanism has a third adjustment member coupled to the control lever member for adjusting the initial position of the control lever member. In this aspect, the initial position (grip width) of the control lever is adjustable through adjustment of the initial position of pivot of the control lever, making adjustment easy.

In accordance with a tenth aspect, the bicycle control device according to the ninth aspect is configured so that the third adjustment member has a third adjustment bolt that is disposed along a second axis intersecting with the first axis.

In this aspect, adjustment is possible by the third adjustment bolt provided along the second axis, making adjustment from the outside easy.

In accordance with an eleventh aspect, the bicycle control device according to the ninth or tenth aspect is configured so that the third adjustment member has a fourth adjustment bolt provided in proximity to the first axis. In this aspect, by providing the fourth adjustment bolt in proximity to the first axis. adjustment is easier, and the device itself can be made more compact.

In accordance with a twelfth aspect, the bicycle control device according to any of the ninth to eleventh aspects is configured so that the first adjustment member has a worm gear bolt that is provided to the control lever member. In this aspect, the adjustment member can be made more compact, and hence the device itself can be made more compact.

The third adjustment member may independently have the third adjustment bolt, the fourth adjustment bolt, or the worm gear bolt, respectively, and it is also possible to have some combination of a plurality of the respective bolts, in which case fine adjustments would be possible.

In accordance with a thirteenth aspect, the bicycle control device according to the eighth aspect is configured so that the hydraulic fluid pressure generator has a rod part that is coupled to the piston and that is operated by the control lever member. The control lever member has a cam member for pivoting about a first axis in conjunction with pivoting of the control lever member, actuating the rod part. The bicycle control device further comprises a fourth adjustment member coupled to the cam member and to the control lever member for adjusting the initial position of the control lever member and an initial position of the cam member in this aspect, it is possible to simultaneously adjust the initial position (grip width) of the control lever and, since of the control lever being coupled to the cam member as well, the initial position of the piston.

In accordance with a fourteenth aspect, the bicycle control device according to the thirteenth aspect is configured so that the fourth adjustment member has a fifth adjustment bolt disposed along a second axis intersecting the first axis. In this aspect, adjustment is possible by the fifth adjustment bolt provided along the second axis, making adjustment of both the initial position (grip width) of the control lever and the initial position of the piston from the outside easy.

In accordance with a fifteenth aspect, the bicycle control device according to the thirteenth or fourteenth aspect is configured so that the fourth adjustment member has a sixth adjustment bolt provided in proximity to the first axis. In this aspect, by providing the sixth adjustment bolt in proximity to the first axis, adjustment is easier, and the device itself can be made more compact.

In accordance with a sixteenth aspect, the bicycle control device according to the thirteenth or fifteenth aspect is configured so that the fourth adjustment member has a worm gear bolt that is provided on one of the control lever member and the cam member, and that is engages the other of the control lever member and the cam member. In this aspect, the adjustment member can be made more compact, and hence the device itself can be made more compact.

The fourth adjustment member may independently have the fifth adjustment bolt, the sixth adjustment bolt, or the worm gear bolt, respectively, and it is also possible to have some combination of a plurality of the respective bolts, in which case finer adjustments would be possible.

According to the present invention, the hydraulic fluid pressure generator is disposed at the second end side relative to the shift-operating mechanism, and therefore the shift-operating mechanism, and the hydraulic fluid pressure generator having the piston position adjustment mechanism, do not overlap in the longitudinal direction. Therefore, the first end side of the grip part can be narrower, making it easy for the rider to grip the grip part, even when the hydraulic fluid pressure generator having the piston position adjustment mechanism is provided to the grip part. It is therefore easier for the rider to operate the control lever member.

Also other objects, features, aspects and advantages of the disclosed bicycle control device will become apparent to those skilled in the art from the following detailed description, which, taken in conjunction with the annexed drawings, discloses several embodiments of the bicycle control device.

BRIEF DESCRIPTION OF THE DRAWINGS

Referring now to the attached drawings which form apart of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
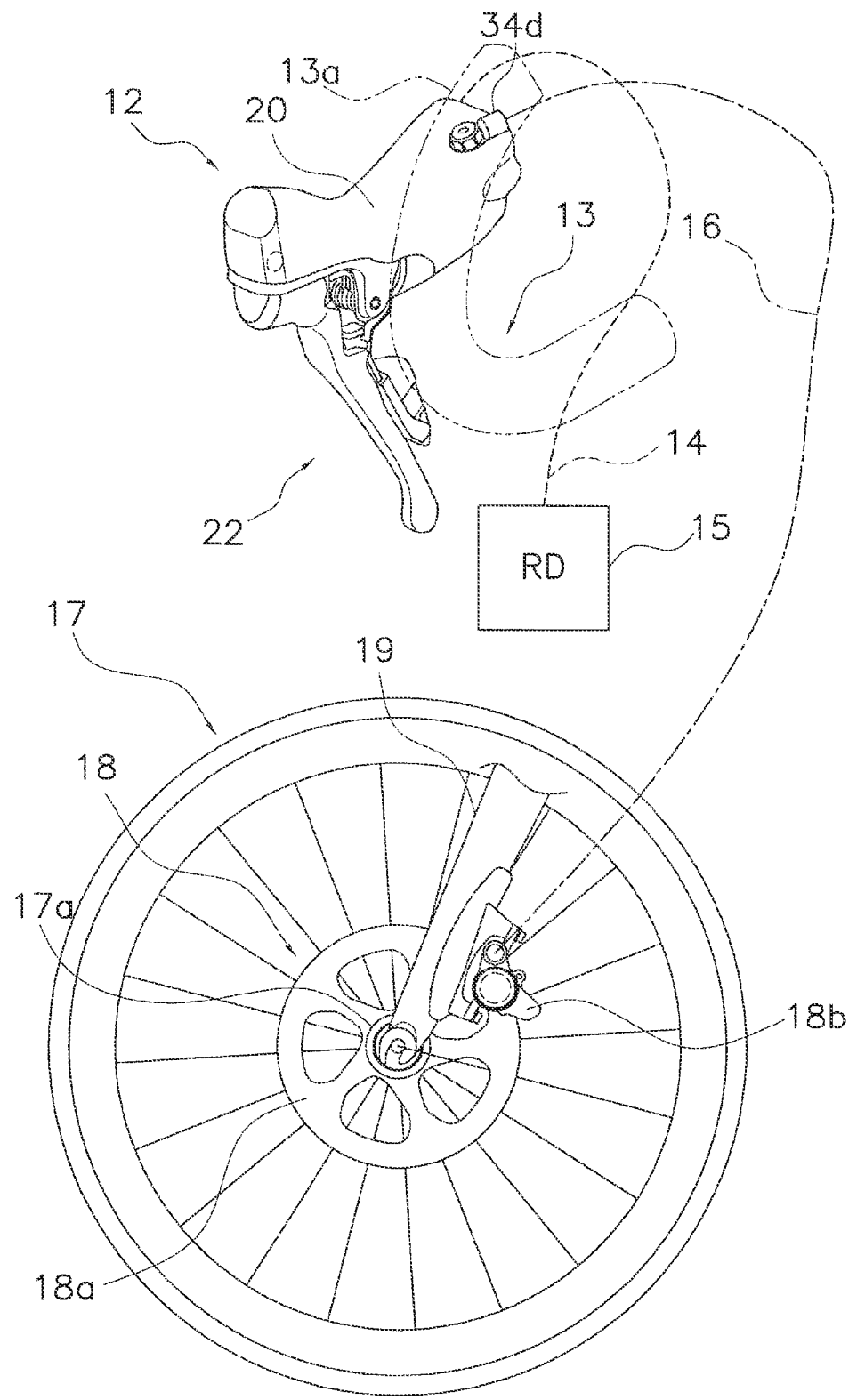
FIG. 1 is a perspective view of a bicycle control device mounted to a portion of a drop handlebar according to a first embodiment, a side elevational view of a front portion of a bicycle with a bicycle braking device controlled by the bicycle control device and a schematic view of a rear derailleur controlled by the bicycle control device.

Referring initially to FIG. 1, a perspective view of a bicycle control device 12 that is mounted to a portion of a drop handlebar 13 according to a first embodiment. Here, only the bicycle control device 12 on the right side of the drop handlebar 13 is shown in FIG. 1. However, it will be apparent that the left side of the drop handlebar 13 has a similar bicycle control device that includes the features of the bicycle control device 12 as discussed herein.

A shift cable 14 acting as a control cable connects the right bicycle control device 12 to a rear derailleur 15. The shift cable 14 is a Bowden cable having an inner cable and an outer casing. A hydraulic fluid pressure hose 16 connects the right bicycle control device 12 to a braking device 18 for braking a front wheel 17. The braking device 18 is a hydraulic fluid pressure disc brake device which is actuated by hydraulic fluid pressure. The braking device 18 includes a brake disc 18a and a caliper 18b. The brake disc 18a is fixedly attached in an integrally manner to a hub 17a of the front wheel 17 so as to rotate with the front wheel 17. The caliper 18b is fixed to a front fork 19 of the bicycle. The caliper 18b brakes or slows the rotation of the front wheel by squeezing the brake disc 18a upon being actuated by the right bicycle control device 12. The left control device (not shown) is coupled to a front derailleur via a shift cable (both not shown), and is also coupled to a braking device of a rear wheel (not shown), for example, via a hydraulic fluid pressure hose. The front derailleur and the rear derailleur 15 are examples of shifting devices. The right-side control device 12 and the left-side braking device (not shown) are mirror images of one another, and except for having different numbers of shift positions, the structure and operation of the bicycle control devices are substantially identical. Thus, only the right-side control device 12 will be described and illustrated in detail herein. In the following description, the bicycle control device is referred to simply as the control device.

Because a majority of the components of the bicycle are conventionally known in the relevant art, details relating to the components of the bicycle are not described or illustrated herein, except for components pertinent to the control device 12 of the present invention. Furthermore, various components of a conventional bicycle not illustrated or described herein, including braking devices, shifting devices, sprockets, and the like, can also be used together with the control device 12 according to the present invention.

Figure 2:
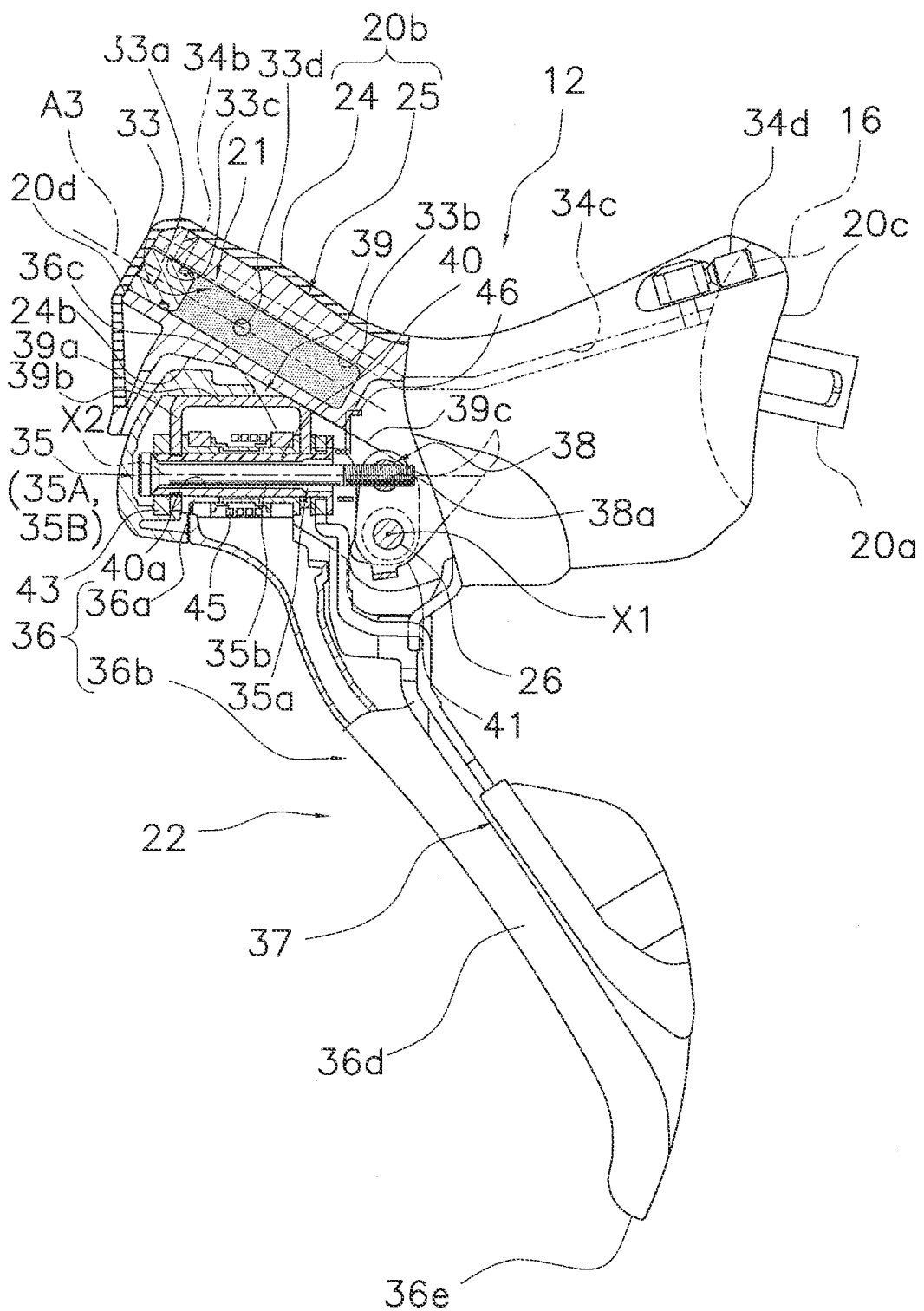
FIG. 2 is a partial cross sectional view of the bicycle control device according to the first embodiment with the section taken along a longitudinal center of the reservoir part of the bicycle control device.
Figure 3:
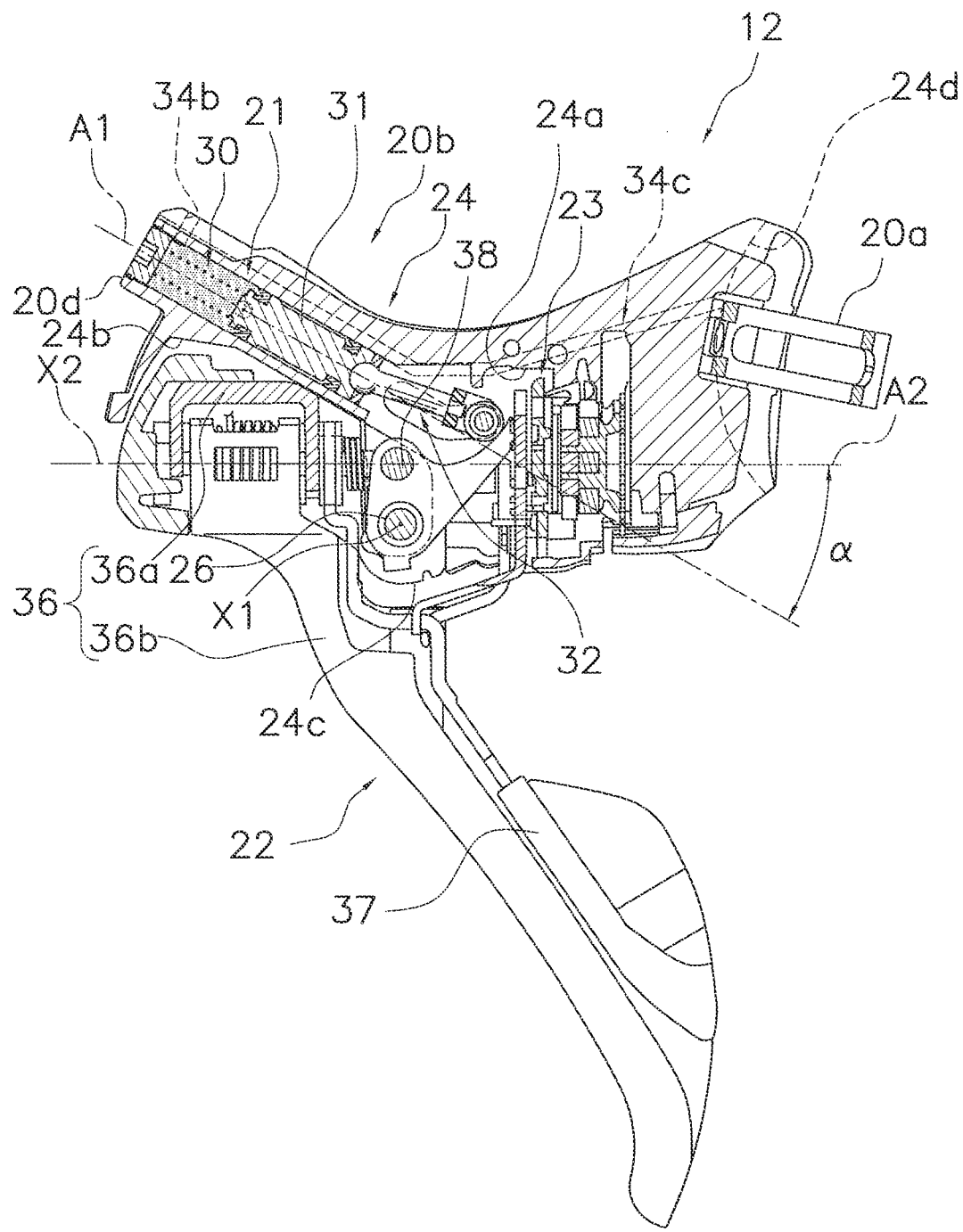
FIG. 3 is a cross sectional view of the bicycle control device according to the first embodiment with the section taken along a longitudinal center of the cylinder part of the bicycle control device having the cover thereof removed, and with selected part shown in elevation.

As shown in FIGS. 2 and 3, the control device 12 has a housing member 20, a hydraulic fluid pressure generator 21, a control lever member 22, a shift-operating mechanism 23 (see FIG. 3) and an adjustment mechanism 35. The housing member 20 basically has an attachment part 20a and a grip part 20b. The attachment part 20a is capable of being attached to a curved part 13a that formed in the end of the drop handlebar 13 of the bicycle. The grip part 20b is provided with the attachment part 20a, and is configured to be gripped by a rider during riding. The attachment part 20a is a conventionally-known band-shaped member, and the control device 12 can be fixed to the drop handlebar 13 by fastening the attachment part 20a by a screw.

The grip part 20b extends longitudinally between a first end 20c and a second end 20d. The grip part 20b has a main grip body 24 and an elastic cover member 25, The main grip body 24 is made of a synthetic resin such as a polyamide resin or a metal such as aluminum. The elastic cover member 25 has an elastic piece that covers the outside surface of the main grip body 24.

The top or upper surface of the main grip body 24 has a downward-curving shaped surface to facilitate gripping of the grip part 20b by hand. As shown in FIGS. 2 and 3, the main grip body 24 has a first housing section 24a (see FIG. 2) provided on the first end 20c side, a second housing section 24b provided on the second end 20d side, and a first bracket 24c provided between the first housing section 24a and the second housing section 24b. The first housing section 24a houses the shift-operating mechanism 23. The second housing section 24b houses a second bracket 39, described below, of the control lever member 22. The hydraulic fluid pressure generator 21 is disposed above the second housing section 24b and aligned with and spaced apart from the shift-operating mechanism 23 in the longitudinal direction. A pair of left and right first brackets 24c is provided that supports both ends of a lever shaft 26 to which the control lever member 22 so as to be pivotal around a first axis X1. The lever shaft 26 is disposed in a left-to-right direction substantially perpendicular to the direction of travel of the bicycle, and has the first axis X1 as its axis. A curved recession 24d that curves so as to following the curved part 13a of the drop handlebar 13 is formed on the first end 20c side of the main grip body 24.

Figure 5:
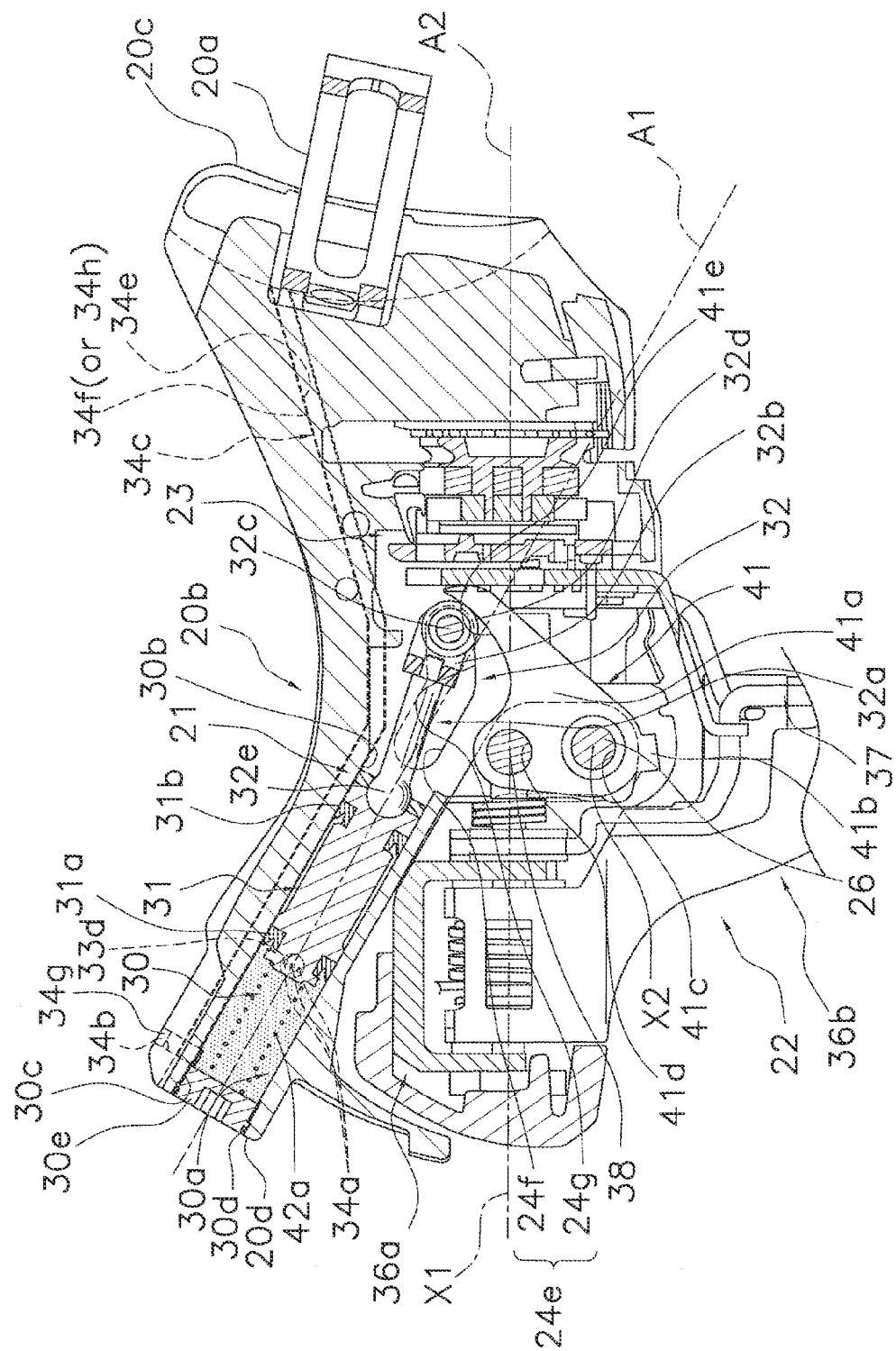
FIG. 5 is a partial longitudinal cross sectional view of the bicycle control device according to the first embodiment with the section taken along a longitudinal center of the housing member of the bicycle braking device to illustrate an upper portion of the control lever member and the shift-operating mechanism.

As shown in FIGS. 2, 3, and 5, the hydraulic fluid pressure generator 21 is provided in order to provide hydraulic pressure to the braking device 18 and cause the braking device 18 to brake. The hydraulic fluid pressure generator 21 includes a cylinder 30, a piston 31, a rod 32 and a reservoir 33 (see FIG. 2). The cylinder 30 is formed in the main grip body 24. The piston 31 moves linearly within the cylinder 30 (i.e., reciprocates linearly within the cylinder 30). The rod 32 is mechanically coupled to the piston 31. The reservoir 33 fluidly coupled to the cylinder 30. The hydraulic fluid pressure generator 21 generates hydraulic pressure through the operation of the piston 31 in an insertion direction of the cylinder 30. The hydraulic fluid pressure generator 21 further includes a first hydraulic fluid channel 34a (see FIG. 5), an outlet port 34b (see FIG. 5), a second hydraulic fluid channel 34c (see FIG. 5), a connection part 34d and a piston-position-adjusting mechanism 35A (see FIG. 2).

Preferably, the cylinder 30 is formed integrally with the main grip body 24. The cylinder 30 is formed, for example, by cutting or die molding from the second end 20d side of the main grip body 24. The cylinder 30 is formed in a cylindrical shape having a cylinder axis A1. The cylinder 30 has a movement space 30a through which the piston 31 moves. The movement space 30a has an open end 30b on a side near the cylinder 30, and a closed end 30c on the second end 20d side opposite the open end 30b. The closed end 30c is sealed by a first seal member 30d. The first seal member 30d has a seal member 30e for sealing the gap with the cylinder 30 formed thereby, and is screwed into the closed end 30c. The closed end 30c is disposed at a higher position than (i.e., above) the open end 30b. Thus, the cylinder axis A1 is disposed so as to incline upwards towards the front. An angle of intersection α connecting the cylinder axis A1 and a cable take-up axis A2 described hereafter, the angle being seen from the side in FIG. 3, is greater than or equal to 20° and less than or equal to 50°. Setting the angle of intersection α in this range allows increases in the size of the grip part 20b to be minimized even if the cylinder 30 is disposed inclined toward the cable take-up axis A2. In the present embodiment, the angle of intersection α is approximately 30°. The cylinder axis A1 is located in front of the cable take-up axis A2 in a left-to-right direction perpendicular with the plane of the drawing in FIG. 3 (i.e., to the left of the cable take-up axis A2), and does not intersect therewith in a plane view.

Figure 4:
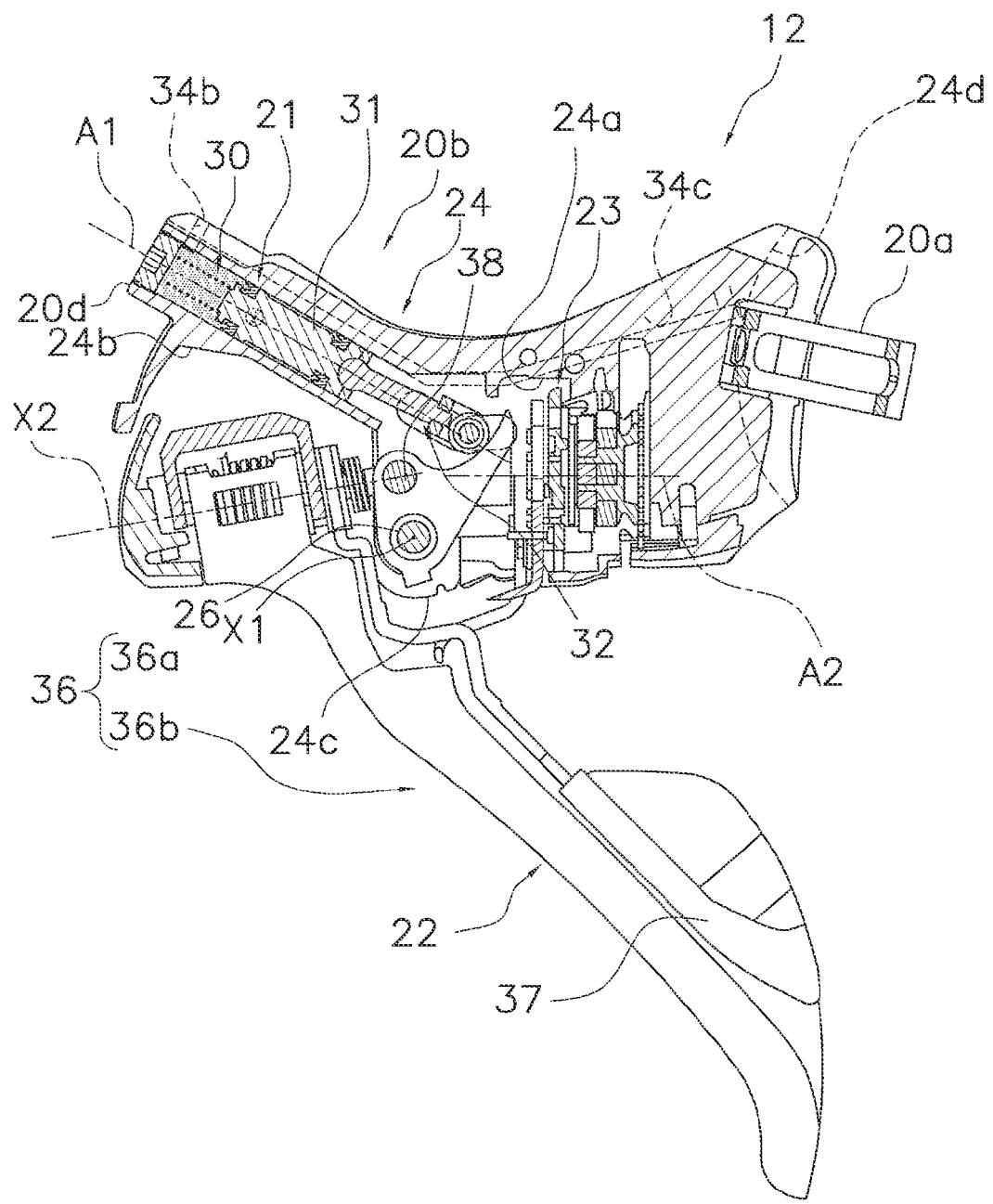
FIG. 4 is a cross sectional view, similar to FIG. 3, of the bicycle control device, when the bicycle control device is operated to perform a braking operation of the bicycle braking device.

The piston 31 is a substantially cylindrical member. The piston 31 has a first seal member 31a and a second seal member 31b installed on the outer circumferential surface of the piston 31 on both ends thereof. The first seal member 31a and the second seal member 31b have, for example, an O-ring shape. The first seal member 31a and the second seal member 31b are provided in order to seal the gap between the inner circumferential surface of the movement space 30a of the cylinder 30 and the outer circumferential surface of the piston 31. It is also acceptable for there to be only one seal member. The piston 31 moves within the movement space 30a between a first position, shown in FIG. 3, at the distal end of the cylinder 30 and a second position, shown in FIG. 4, located deeper within than the first position in response to a braking operation performed by the brake lever member 22. The piston 31 is biased towards the first position by a first return spring 42a.

The rod part 32 withdraws in the cylinder 30 in response to an operation of the brake lever member 22 in the braking direction. The rod part 32 is coupled to the piston 31 so as to freely pivot around an axis substantially parallel to the first axis X1. The rod part 32 has a rod body 32a, a dual-peaked clevis pin 32b mounted on a tip of the rod body 32a, a rotational shaft 32c inserted in the clevis pin 32b, and a pair of left and right rollers 32d attached to the rotational shaft 32c so as to be freely rotatable. The left and right rollers 32d are disposed apart from each other by a distance of 1.5 to 2.5 times the diameter of the roller part 32d. The rod body 32a is a rod-shaped member. The rod body 32a has a cylinder insertion end 32e engaging with the piston 31. The cylinder insertion end 32e is a partial sphere having a greater diameter than the rest of the rod body 32a. Thus, in the present embodiment, the rod part 32 freely pivots with respect to the cylinder 30 on an axis parallel to the second axis X2. The two ends of the rotational shaft 32c engage with a pair of guide grooves 24e provided in the main grip body 24. The guide grooves 24e have a first part 24f disposed along the cylinder axis A1 and a second part 24g bending upward from the first part 24f. The roller part 32d is depressed by a cam member 41, described hereafter. The cam member 41 is provided on the brake lever member 22. Thus, when the roller part 32d is depressed by the cam member 41, the rotational shaft 32c at the distal end of the rod part 32 gradually approaches cylinder axis A1. The angle formed by the rod part 32 and the cylinder axis A1 thereby gradually decreases, facilitating the movement of the piston 31 within the cylinder 30.

Figure 6:
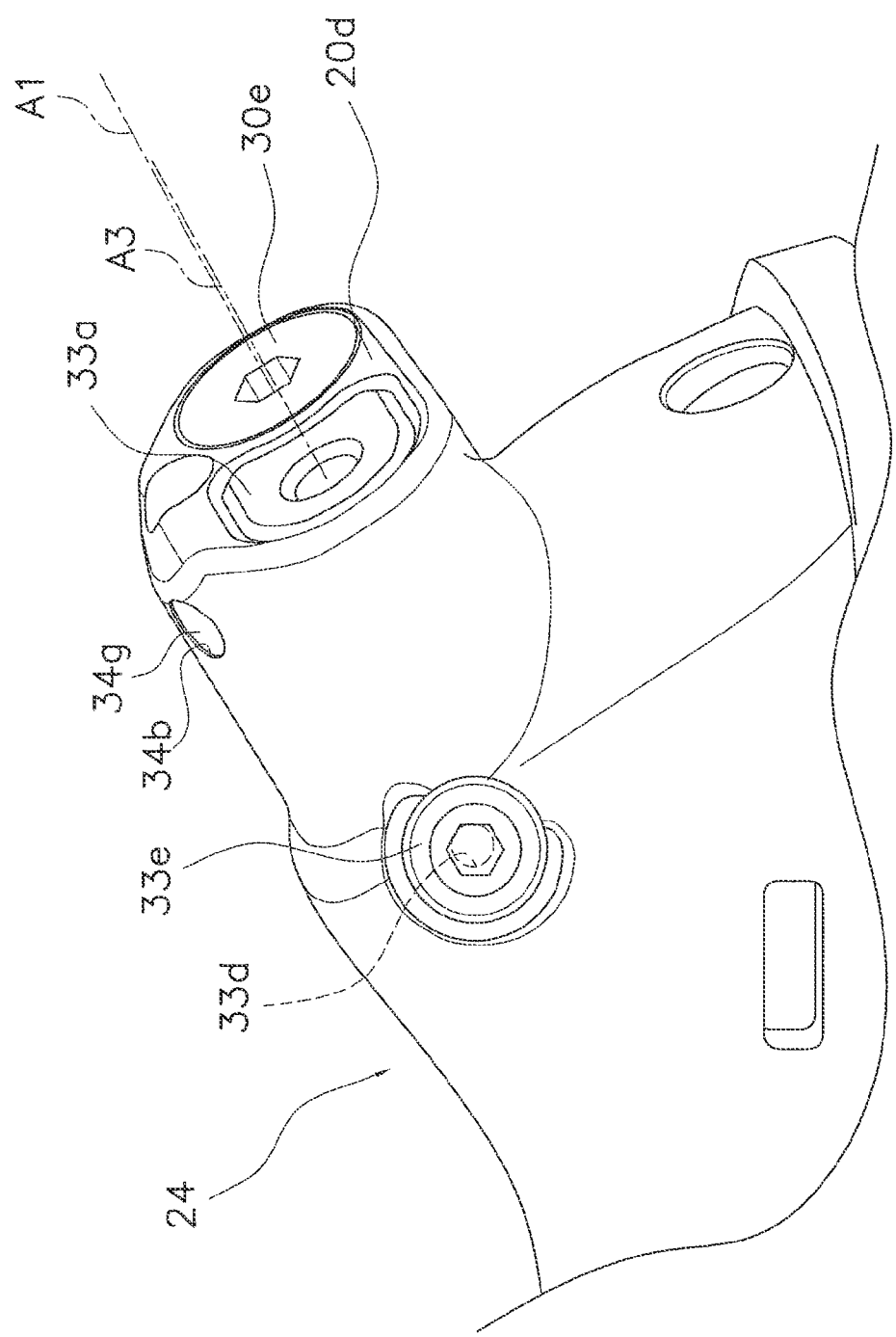
FIG. 6 is a partial perspective view of an end part of the grip part of the housing member of the bicycle braking device according to the first embodiment.

As shown in FIG. 2, the reservoir 33 is capable of storing hydraulic fluid for generating hydraulic pressure. The reservoir 33 is provided so that the necessary amount of hydraulic fluid can be injected from the reservoir 33 even if the friction material (for example, a brake pad) of the braking device 18 becomes worn, which as a result may require large amounts of hydraulic fluid. Also, the reservoir 33 prevents inconsistencies in the pressure being applied to the braking device 18 due to swelling and contraction caused by changes in the temperature of the hydraulic fluid. The reservoir 33 is formed in a cylindrical shape having a reservoir axis A3. The reservoir 33 is provided in the grip part 20b spaced apart from and aligned with the cylinder 30 in a left-to-right direction intersecting the longitudinal direction. The reservoir axis A3 is essentially parallel with the cylinder axis A1, and at essentially the same height. Thus, the reservoir 33 is firmed to the interior of the cylinder 30 at the same inclination as the cylinder 30 in a right-to-left direction perpendicular with the surface of the drawing in FIG. 2. The reservoir 33 inclines upward and forward on the second end side of the main grip body 24. The reservoir 33 has a first end-side first closed end 33b and a second end-side second dosed end 33c. At least one of the first closed end 33b or the second closed end 33c is sealed by a second seal member 33a which is detachably installed in the reservoir 33. In the present embodiment, the second end-side second closed end 33c is sealed by the second seal member 33a. The second seal member 33a is fixed in the reservoir via suitable means, such as bonding, pressure injection, screws, or the like. As shown in FIG. 6, the reservoir 33 has a hydraulic fluid injection hole 33d opening on a side surface capable of being opposed to the first hydraulic fluid channel 34a on the second end 20d of the main grip body 24. The hydraulic fluid injection hole 33d is sealed by a hydraulic fluid injection cap 33e detachably installed on the end of the hydraulic fluid injection hole 33d.

As shown in FIG. 5, the first hydraulic fluid channel 34a is provided in order to fluidly connect the cylinder 30 and the reservoir 33. The first hydraulic fluid channel 34a is disposed closer to the second end 20d than is the first seal member 31a to the second end 20d when the piston Si is disposed in the first position. The first hydraulic fluid channel 34a is disposed closer to the rod part 32 than is the first seal member 31a to the rod part 32 when the piston 31 is disposed in the second position. In the present embodiment, the first hydraulic fluid channel 34a is oppositely disposed with respect to the hydraulic fluid injection hole 33d. The first hydraulic fluid channel 34a is constituted by a plurality of holes (for example, three holes) of a smaller diameter than the hydraulic fluid injection hole 33d so as to be formable via the hydraulic fluid injection hole 33d.

The outlet port 34b serves to convey hydraulic pressure generated in the cylinder 30 to the exterior, When the piston 31 is disposed in the second position, the outlet port 34b is disposed closer to the second end 20d than the first seal member 31a. The outlet port 34b is formed penetrating the inner circumferential surface of the cylinder 30 and the side surface of the main grip body 24. The side surface-penetrating part of the outlet port 34b is sealed by a plug 34g.

The second hydraulic fluid channel 34c is coupled to the outlet port 34b. The second hydraulic fluid channel 34c communicates with the outlet port 34b and extends bending toward the first end 20c. The second hydraulic fluid channel 34c is constituted by a hydraulic pressure tube 34f that is disposed within a tube hole 34e. The tube hole 34e extends from the first end 20c and the second end 20d. The upper part of the main grip body 24 curves in a downward recession. Thus, the second hydraulic fluid channel 34c is arranged to define a substantially flattened V shape.

The connection part 34d is connected to the second hydraulic fluid channel 34c. The connection part 34d communicates with the outlet port 34b via the second hydraulic fluid channel 34c. The connection part 34d is connectable with the exterior hydraulic pressure hose 16 (see FIG. 1), which is capable of being coupled to the braking device 18. As seen in FIG. 2, the connection part 34d is disposed adjacent to side of the second hydraulic fluid channel 34c that is located at the first end 20c, i.e., the connection part 34d is disposed adjacent to the first end 20c of the housing member 20.

In the present embodiment, the adjustment mechanism 35 has a piston-position-adjusting mechanism 35A capable of adjusting the initial position of the piston with respect to the cylinder, and a control lever position adjustment mechanism 35B capable of adjusting the initial position of the control lever with respect to the housing.

The piston-position-adjusting mechanism 35A has a function of adjusting the first position of the piston 31 with respect to the cylinder 30 (an example of the initial position of the piston 31). The piston-position-adjusting mechanism 35A also has a function of actuating the piston 31 while coupled to the first operating lever 36 and a cam member 41 described hereafter. The piston-position-adjusting mechanism 35A has an adjustment member 35a for coupling a first operating lever 36, described hereafter, of the control lever member 22 and the cam member 41, also described hereafter. The adjustment member 35a is an example of a first adjustment member. The adjustment member 35a has an adjustment bolt 35b penetrating a support shaft 40, described hereafter, of the first operating lever 36. Here, the adjustment bolt 35b is an example of a first adjustment bolt.

A proximal head of the adjustment bolt 35b catches on a through-hole 40a of the support shaft 40. A distal end of the adjustment bolt 35b is screwed into a coupler shaft 38 provided on the cam member 41, described hereafter, of the control lever member 22. The initial position of the cam member 41 with respect to the first axis X1 can thus be adjusted, allowing the first position of the piston 31 to be adjusted. The second bracket 39 and the cam member 41 are coupled by the adjustment bolt 35b, and the cam member 41 rotates in response to the pivoting of the first operating lever 36 around the first axis. Thus, the adjustment bolt 35b has a function of adjusting the first position of the piston 31 and a function of coupling the first operating lever member 22 to the cam member 41.

The control lever position adjustment mechanism 35B has a basic configuration similar to that of the piston-position-adjusting mechanism 35A. The control lever position adjustment mechanism 35B has a function of adjusting the first position of the first operating lever member 22 with respect to the housing member 20 (an example of the initial position of the control lever member 22). The control lever position adjustment mechanism 35B has a function of actuating the piston 31 while coupled to the first operating lever 36. The control lever position adjustment mechanism 35B has a cam member 41 described hereafter. The piston-position-adjusting mechanism 35A has an adjustment member 35a for coupling a first operating lever 36, described hereafter, of the control lever member 22 to the cam member 41, also described hereafter. Here, the adjustment member 35a is an example of a third adjustment member, and the adjustment bolt 35b is an example of a third adjustment bolt. The adjustment member 35a has an adjustment bolt 35b penetrating a support shaft 40, described hereafter, of the first operating lever 36. A proximal head of the adjustment bolt 35b catches on a through-hole 40a of the support shaft 40. A distal end of the adjustment bolt 35b is screwed into a coupler shaft 38 provided on the cam member 41, described hereafter, of the control lever member 22. It is thus possible to adjust the initial position of the control lever member 22 with respect to the first axis X1, as well as the first position of the control lever member 22, i.e., the control lever member 22. The second bracket 39 and the cam member 41 are coupled by the adjustment bolt 35b. The cam member 41 rotates in response to the pivoting of the first operating lever 36 around the first axis X1. Thus, the adjustment bolt 35b has a function of adjusting the first position of the first operating lever 36 and of coupling the first operating lever member 22 and the cam member 41.

Moreover, the adjustment mechanism 35 has a configuration similar to that the piston-position-adjusting mechanism 35A and the control lever position adjustment mechanism 35B. Thus, by coupling the second bracket 39, the cam member 41 and the first operating lever 36, the adjustment bolt 35b has a function of adjusting the first position of the piston 31, a function of adjusting the first position of the first operating lever 36 and a function of coupling the first operating lever member 22 and the cam member 41. Here, the adjustment member 35a is an example of a fourth adjustment member, and the adjustment bolt 35b is an example of a fifth adjustment bolt.

Figure 7:
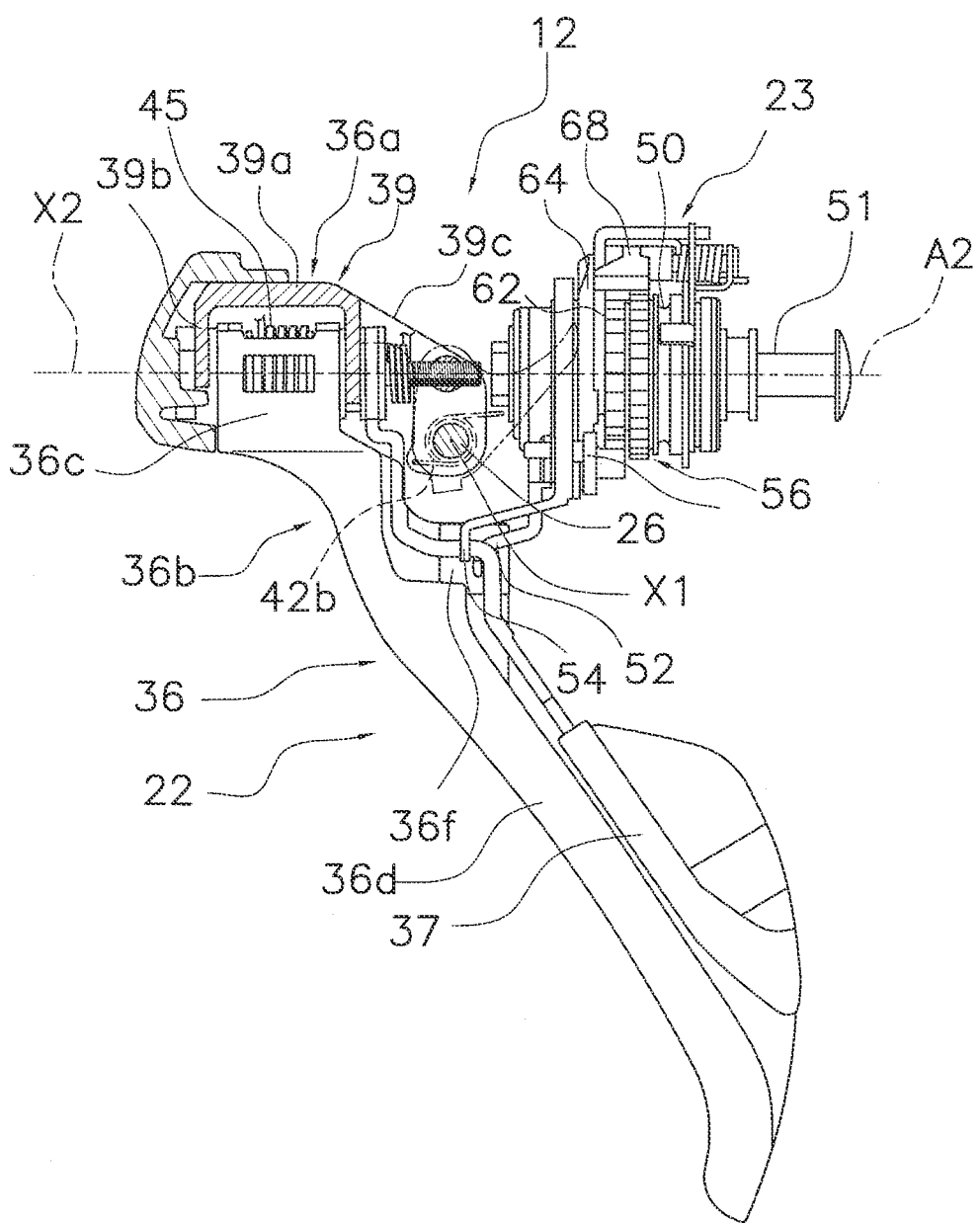
FIG. 7 is a side elevational view of the control lever member and the shift-operating mechanism of the bicycle control device illustrated in FIG. 4, with a portion of the control lever member shown in cross section for purposes of illustration.

As shown in FIG. 2 and FIG. 7, the control lever member 22 includes the first operating lever 36, the second operating lever 37 and the cam member 41. The first operating lever 36 has a support member 36a and a lever 36b coupled to the support member 36a so as to be pivotal around a second axis X2. The support member 36a is coupled to the lever shaft 26 disposed on the housing member 20 so as to be pivotal around the first axis X1. The support member 36a pivots around the first axis X1 from a first initial position shown in FIG. 2 to a pivoting position shown in FIG. 4. As shown in FIG. 7, the support member 36a is biased towards the first initial position by a second return spring 42b in the form of a coil spring. The second return spring 42b is coiled around the lever shaft 26. One end of the second return spring 42b engages with the first bracket 24c of the main grip body 24, and another end engages with one of a pair of side plates 39c of the support member 36a, described hereafter.

As shown in FIG. 2, the support member 36a has a second bracket 39 and a flanged hollow support shaft 40. The second bracket 39 is formed by folding a sheet of metal front to back and left to right. The flanged hollow support shaft 40 is supported by the second bracket 39. The second bracket 39 has a substantially rectangle base 39a, a pair of front and back support plates 39b and a pair of left and right side plates 39c. The front and back support plates 39b are formed by folding the front and back ends of the base 39a downwards in parallel. The left and right side plates 39c are formed by folding the left and right ends of the base 39a downwards in parallel. The two ends of the support shaft 40 are supported by the support plates 39b. The side plates 39c extend backwards from the base 39a and are supported by the lever shaft 26 so as to freely pivot around the first axis X1. The support shaft 40 is disposed along a direction not parallel with the first axis X1 (for example, a counter direction), i.e., along a second axis X2 substantially parallel with the direction of travel of the bicycle. The support shaft 40 is disposed above the lever shaft 26. The support shaft 40 is mounted to the support plates 39b of the support member 36a by a nut 43 that screws onto an end of the support shaft 40. As described above, the adjustment bolt 35b is disposed penetrating the support shaft 40.

As shown in FIGS. 2 and 7, the lever 36b is coupled, along with the support member 36a, to the lever shaft 26 so as to freely pivot around the first axis X1. Also the lever 36b is coupled, along with the support member 36a, to the support shaft 40 so as to pivot around the second axis X2. The lever 36b is provided in order to perform braking operations and shifting operations in one direction of the rear derailleur 15. The lever 36b is controllably coupled to the shift-operating mechanism 23 so as to pivot around the second axis X2, thereby operating a cable take-up member 50, described hereafter, of the shift-operating mechanism 23 and taking up, i.e., pulling the shift cable 14, so as to upshift (or downshift) the rear derailleur 15. In addition, the pivoting of the lever 36b around the first axis X1 generates hydraulic pressure, thereby causing the braking device 18 to apply a braking force.

Figure 8:
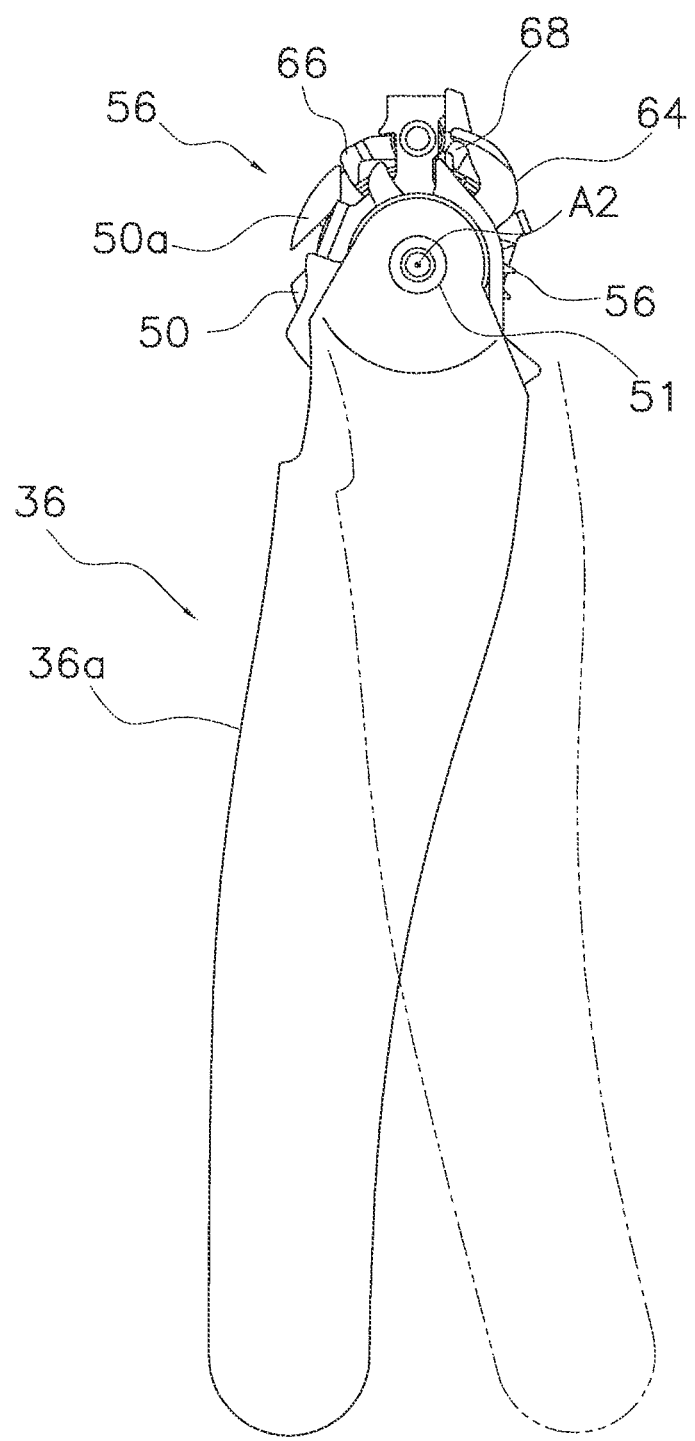
FIG. 8 is a front elevational view of the first operating lever of the bicycle control device for operating the bicycle braking device and the shift-operating mechanism with the first operating lever shown in full lines for illustrating the rest position and shown in broken lines for illustrating an operated position to operate the shift-operating mechanism.

As shown in FIG. 2, the lever 36b has an insertion end part 36c, a shift operation part 36d and a free end part 36e. The lever 36b has a contact part 36f provided between the insertion end part 36c and the shift operation part 36d. The contact part 36f is capable of contacting the second operating lever 37 when the first operating lever 36 is operated from a second initial position to a first shift position. The second operating lever 37 can thus be pivoted together with the first operating lever 36. As shown in FIG. 8, the lever 36b moves around the second axis X2 between the second initial position, indicated by solid lines, and the first shift position, indicated by double dotted dashed lines. The insertion end part 36c is rotatably coupled to the support shaft 40. The shift operation part 36d extends downward from an end part of the housing member 20. The lever 36h is an example of a take-up lever. The lever 36b is biased towards the second initial position by a third return spring 45 coiled around the support shaft 40. One end of the third return spring 45 engages with the insertion end part 36c, and another end engages with a pair of bases 39a of the support member 36a.

In the present embodiment, the second operating lever 37 is coupled to an end of the support shaft 40 so as to freely pivot around the second axis X2, and is provided in order to perform shifting operations in the other direction of the rear derailleur 15. The second operating lever 37 is controllably coupled to the shift-operating mechanism 23 so as to operate the cable take-up member 50 and unwind, i.e., release the shift cable 14, thereby downshifting or upshifting the rear derailleur 15.

Figure 9:
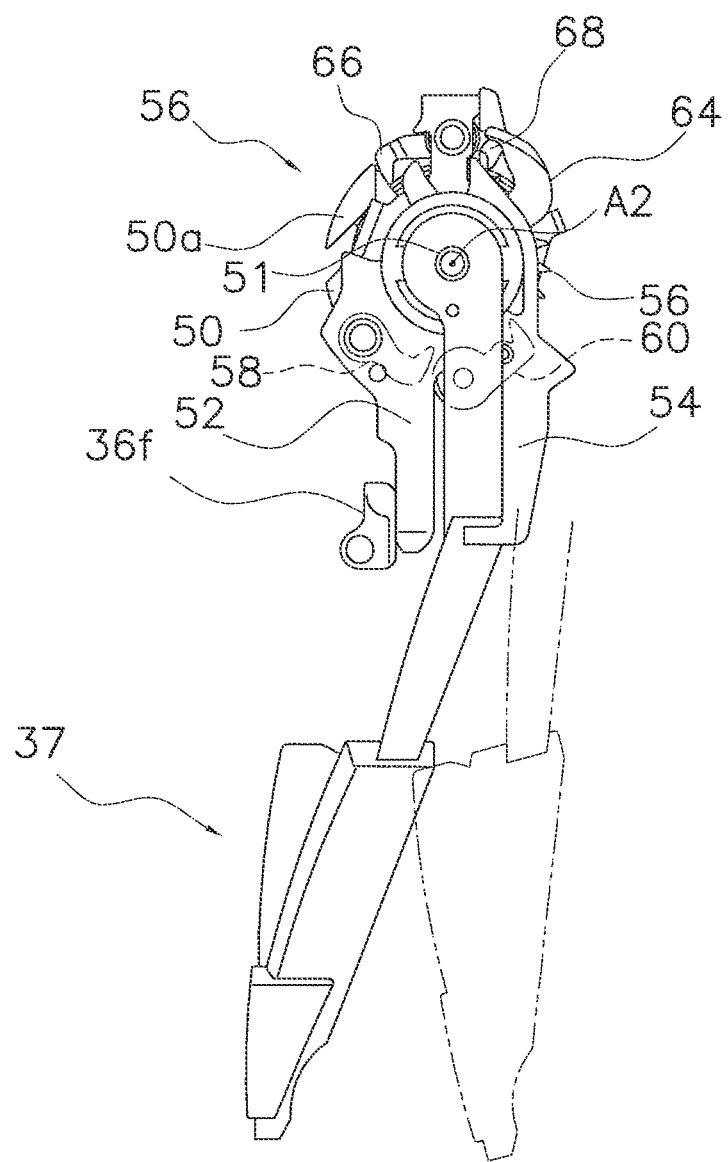
FIG. 9 is a front elevational view of the second operating lever of the bicycle control device for operating the shift-operating mechanism with the first operating lever shown in full lines for illustrating the rest position and shown in broken lines for illustrating an operated position to operate the shift-operating mechanism.
Figure 10:
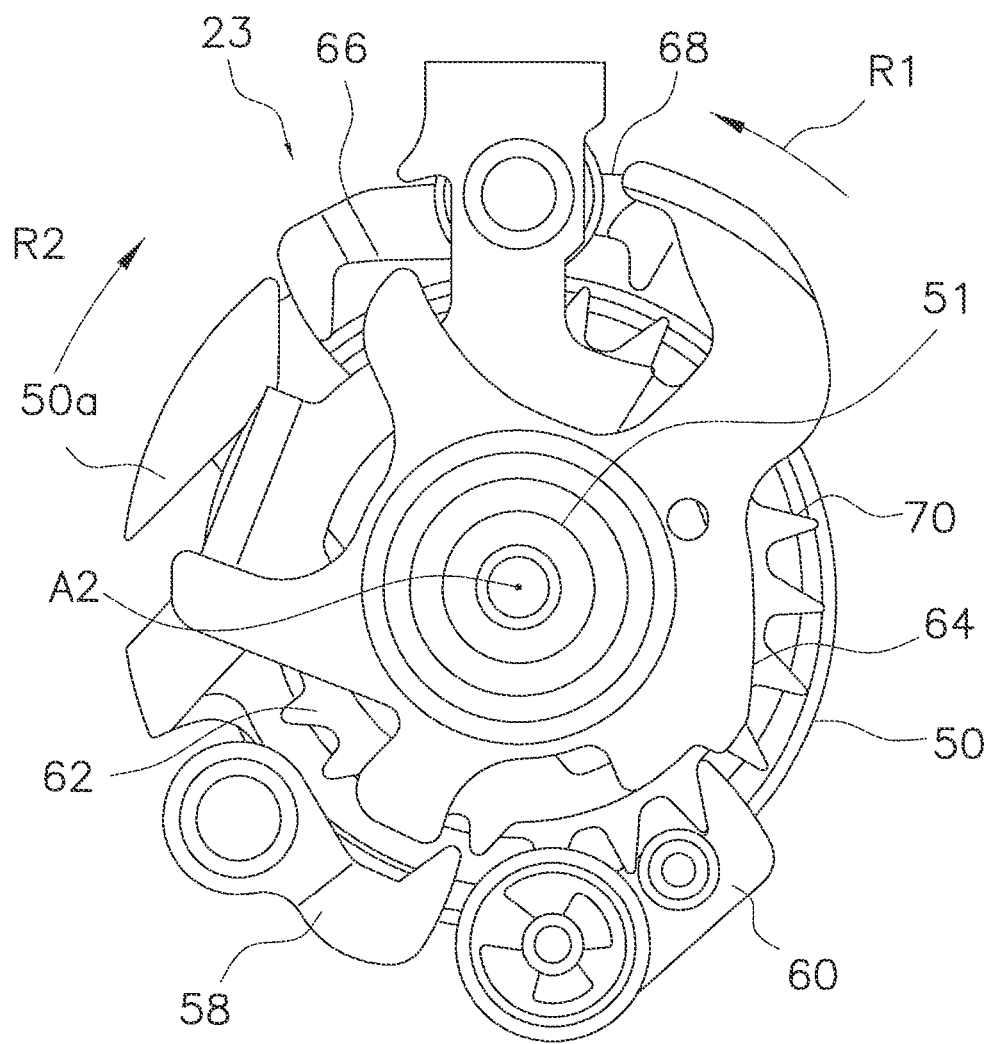
FIG. 10 is a front elevational view of the shift-operating mechanism of the bicycle control device.

As shown in FIG. 9, the second operating lever 37 moves around the second axis X2 between a third initial position, indicated by solid lines, and a second shift position, indicated by double dotted dashed lines. The second operating lever 37 is rotatably attached to an end of the support shaft 40 so as to freely rotate around the second axis X2. As described above, the second operating lever 37 is controllably coupled to the shift-operating mechanism 23 so as to release the shift cable 14. The second operating lever 37 is an example of a release operating lever. The second operating lever 37 is biased towards the third initial position by a fourth return spring 46 (see FIG. 2) disposed between the support shaft 40 and the cam member 41. One end of the fourth return spring 46 engages with the insertion end of the second operating lever 37, and another end engages with the main grip body 24.

In the present embodiment, the shift-operating mechanism 23 is operated essentially by rotating the first operating lever 36 around the second axis X2 of the support shaft 40, or by rotating the second operating lever 37 around the second axis X2 of the support shaft 40.

As shown in FIG. 5, the cam member 41 is provided so as to pivot around the first axis X1 and actuate the rod part 32 of the hydraulic fluid pressure generator 21 in response to the pivoting of the first operating lever 36 around the first axis X1. The cam member 41 has a pair of left and right cam plates 41a, and a coupling part 41b. The coupling part 41b is integrally formed with the pair of cam plates 41a for coupling the cam plates 41a. The cam plates 41a are disposed spaced apart from each other in the left-to-right direction with the same distance therebetween as between the pair of rollers 32d. The cam plates 41a has a through-hole 41c through which the lever shaft 26 can penetrate, a coupling hole 41d, and a cam surface 41e contacted by the rollers 32d. The through-hole 41c is formed on the lower part of the cam member 41. The coupling hole 41d is formed above the through-hole 41c. The coupling hole 41d supports a coupler shaft 38 for coupling to the first operating lever 36 via the piston-position-adjusting mechanism 35A. The coupling hole 41d is formed in a slightly elliptical shape so that the coupler shaft 38 is capable of movement in a direction connecting the coupling hole 41d and the through-hole 41c when the cam member 41 pivots. In the embodiment, the cam surface 41e has a curved recession formed therein so that, when the cam member 41 pivots, the degree of movement of the piston 31 in response to the rotation of the cam member 41 varies. Specifically, so that the degree of movement increases during an initial rotation period, and decreases after rotation has progressed. This allows for braking to take effect within a short period of time, and for the easy adjustment of braking force once braking has taken effect.

The cam member 41 is coupled to the lever shaft 26 penetrating the through-hole 41c so as to pivot around the first axis X1. A screw hole 38a into which the adjustment bolt 35b is screwed is formed in the coupler shaft 38 in a central part of the axial direction. The cam member 41 is biased in the clockwise direction in FIG. 5 by the second return spring 42b (see FIG. 7) that is provided on the lever shaft 26. The cam member is also biased in the clockwise direction in FIG. 5 by the first return spring 42a.

The shift-operating mechanism 23 will be briefly described with references to FIGS. 7-10. However, the shift-operating mechanism 23 is not limited to the structure described herein. A shift-operating mechanism of a different configuration can be used for the aforementioned control lever member 22 having the first operating lever 36 and the second operating lever 37. The shift-operating mechanism 23 is attached to a first end 29c side of the main grip body 24 of the housing member 20. The shift-operating mechanism 23 has a cable take-up member 50, a first input member 52, a second input member 54, and a positioning mechanism 56. The center of a cable take-up shaft 51 extending in the longitudinal direction of the grip part 20b is defined as the cable take-up axis A2. In the present embodiment, the cable take-up axis A2 is coaxial with the second axis X2.

An inner cable of the shift cable 14 is coiled around the cable take-up member 50. The cable take-up member 50 is attached to the cable take-up shaft 51 so as to freely rotate around the cable take-up axis A2. The cable take-up member 50 is biased in a cable unwinding direction by a return spring not shown in the drawings. Specifically, the return spring applies a biasing force to the cable take-up member 50 so as to rotate in the cable unwinding direction. The cable take-up member 50 has a substantially cylindrical shape having a cable attachment part 50a capable of attaching to a nipple (not shown) mounted on an end of the inner cable of the shift cable 14. When the first operating lever 36 is operated from the second initial position towards the first shift position, the cable take-up member 50 rotates around the cable take-up axis A2 in a first rotational direction R1 (see FIG. 10) and takes up the inner cable. When the second operating lever 37 is operated from the third initial position towards the second shift position, the cable take-up member 50 rotates around the cable take-up axis A2 in a second rotational direction R2 (see FIG. 10) and reels out the inner The first input member 52 and the second input member 54 are independently coupled to the first operating lever 36 and the second operating lever 37 so as to allow a shifting operation to be performed. The first input member 52 pivots around the cable take-up axis A2 in response to the pivoting of the first operating lever 36 around the second axis X2. As shown in FIG. 7, an end of the first input member 52 is capable of contacting the contact part 36f of the lever 36b. Thus, when the first operating lever 36 is pivoted around the second axis X2 from the second initial position to the first shift position, the first input member 52 pivots around the cable take-up axis A2.

The second input member 54 pivots around the cable take-up axis A2 in response to the pivoting of the second operating lever 37 around the second axis X2. An end of the second input member 54 is capable of contacting an intermediate part of the second operating lever 37. Thus, when the second operating lever 37 is pivoted around the second axis X2 from the third initial position to the second shift position, the second input member 54 pivots around the cable take-up axis A2.

The positioning mechanism 56 is a mechanism for determining the rotational position of the cable take-up member 50 according to the gear shift lever. The positioning mechanism 56 has a take-up pawl 58, a release pawl 60, a take-up plate 62, a release plate 62, a positioning pawl 66, a detent pawl 68, and a positioning plate 70. The take-up pawl 58 is pivotally provided on the first input member 52. The take-up pawl 58 pivots together with the first input member 52 when the first operating lever 36 is operated from the second initial position towards the first shift position. The take-up pawl 58 thus urges the cable take-up member against the biasing force of the return spring and rotates the cable take-up member 50 in the first rotational direction R1.

The release pawl 60 is pivotally provided on the second input member 54. The release pawl 60 pivots together with the second input member 54 when the second operating lever 37 is operated from the third initial position towards the second shift position. The release pawl 60 is thereby detached from the cable take-up member 50, and the cable take-up member 50 is rotated in the second rotational direction R2 by the biasing force of the return spring.

The take-up plate 62 and the positioning plate 70 are attached to the cable take-up member 50, and rotate integrally with the cable take-up member 50. The take-up plate 62 has a plurality of take-up cogs. The take-up cogs selectively engage with the take-up pawl 58. The cable take-up member 50 thus rotates in the first rotational direction R1.

The positioning plate 70 has a plurality of positioning cogs. The positioning cogs selectively engage with the positioning pawl 66. The cable take-up member 50 is thereby kept at a predetermined shift position after either a take-up operation by the first operating lever 36 or a release operation by the second operating lever 37.

The release plate 62 is rotated by the release pawl 60 in the first rotational direction R1 so that the positioning pawl 66 and the detent pawl 68 selectively engage and disengage with the release plate 62 from the positioning plate 70 so as to rotate the cable take-up member 50 in the second rotational direction R2.

In the embodiment shown in the drawings, a rider can rotate the first operating lever 36 from a first initial position to a braking position while grasping the drop handlebar 13 or the curved part of the grip part 20b. The first operating lever 36 rotates around the first axis X1 The rotation of the first operating lever 36 causes the piston 31 of the hydraulic fluid pressure generator 21 to be depressed, generating hydraulic pressure within the cylinder 30, and the hydraulic pressure activates the braking device 18, braking the bicycle.

The first operating lever 36 is capable of rotating around the second axis X2 and pivoting sideways from the second initial position to a shift position in order, for example, to downshift the rear derailleur 15 into a lower gear. When released, the first operating lever 36 is returned to the second initial position by the biasing force of the third return spring 45. The second operating lever 37 is capable of pivoting sideways from a resting position in order, for example, to upshift to a higher gear, and, when released, is returned to the third initial position by the biasing force of the fourth return spring 46.

When the first operating lever 36 is pivoted in order to shift gears, the second operating lever 37 pivots along with the first operating lever 36 instead of moving in opposition to the first operating lever 36. The first operating lever 36 is thus capable of pivoting without being impeded by the second operating lever 37.

While grasping the lowest position of the curved part of the drop handlebar 13, a rider can, for example, extend the middle finger or ring finger of the hand grasping the curved part, place the finger on the first operating lever 36, and pull the first operating lever 36 to a braking position, i.e., towards the curved part 13a. This operation of the lever causes the shift-operating mechanism 23 to rotate around the first axis X1 with the support member 36a. This rotational movement of the first operating lever 36 generates hydraulic pressure, braking the bicycle.

First Modification

In the following description, only those features differing from the embodiment described above are described and numbered in the drawings, and description of the configuration and operation of other features similar to those of the embodiment described above, as well as numbering thereof in the drawings, will be omitted.

Figure 11:
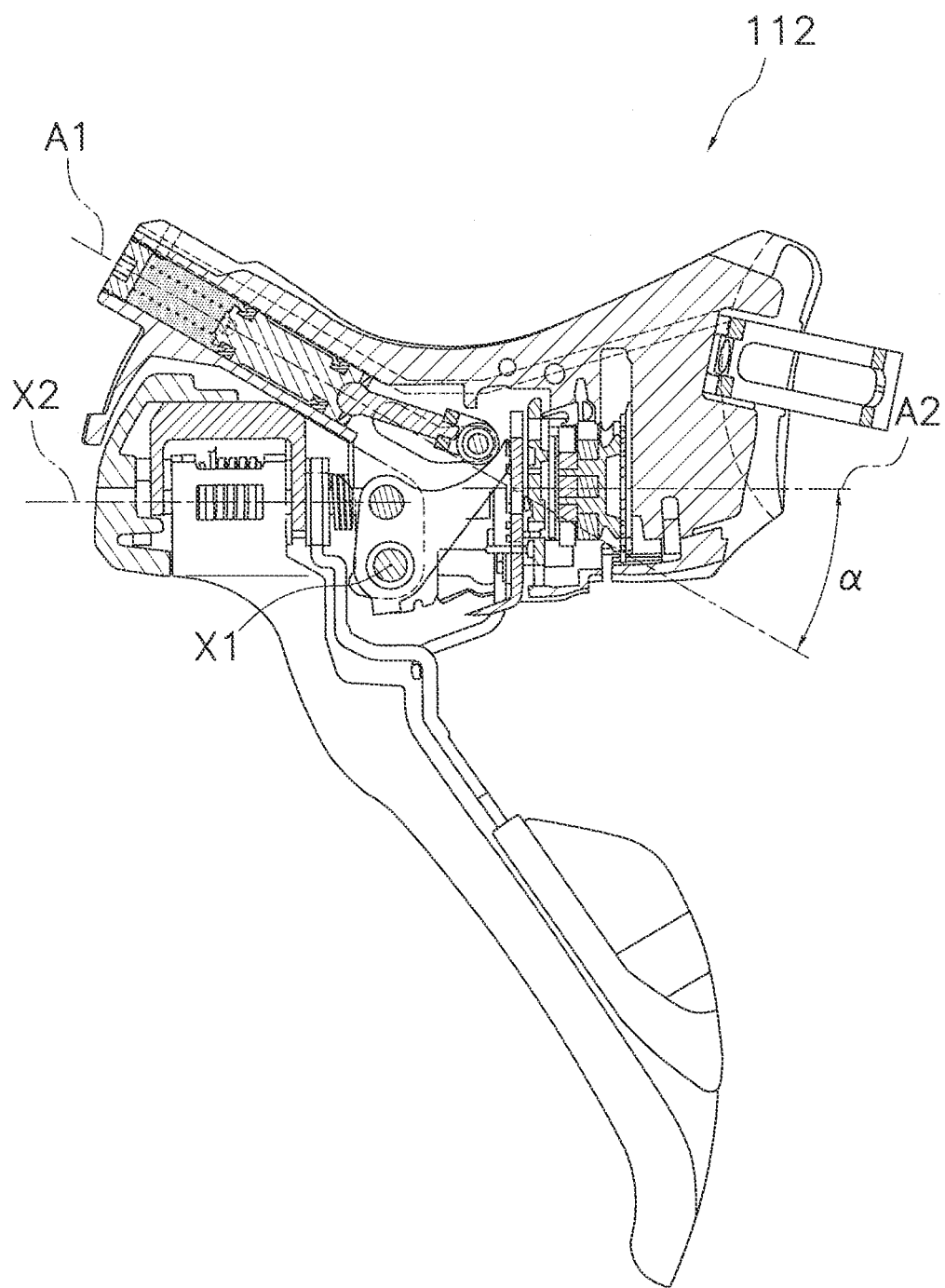
FIG. 11 is a cross sectional view of a bicycle control device according to a first modification of the bicycle control device illustrated in FIG. 3, with the section taken along a longitudinal center of the cylinder part of the bicycle control device, and with selected part shown in elevation.

In the embodiment described above, the second axis X2 and the cable take-up axis A2 were coaxial, but the present invention is not limited to such a configuration. As shown in FIG. 11, the second axis X2 and the cable take-up axis A2 can be on different axes in a control device 112. In FIG. 11, the cable take-up axis A2 of a shift-operating mechanism 123 is disposed below the second axis X2 of a control lever member 122. The cable take-up axis A2 and the second axis X2 may also be disposed so as to intersect.

Second Modification

Figure 12:
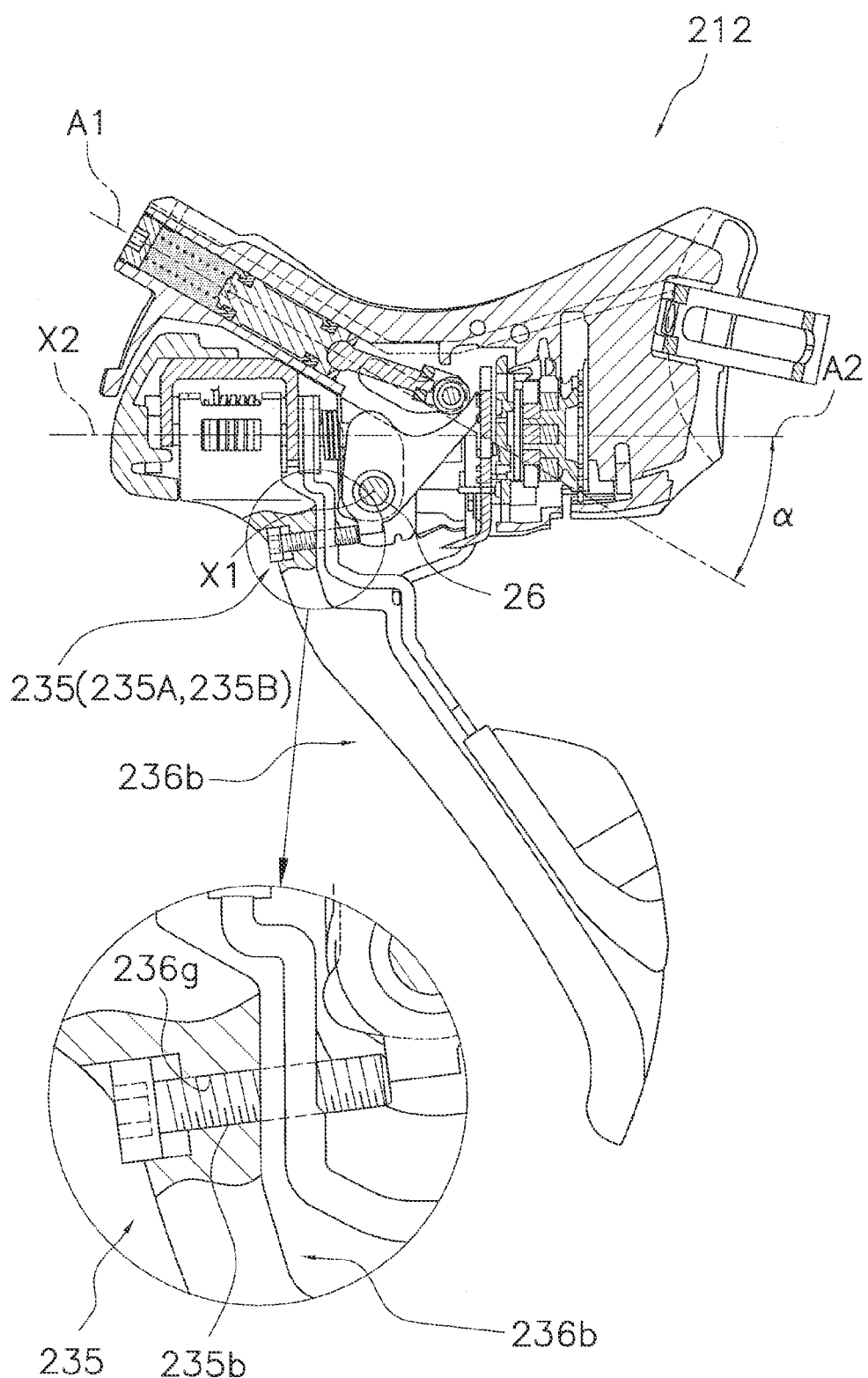
FIG. 12 is a cross sectional view of a bicycle control device according to a second modification of the bicycle control device illustrated in FIG. 3, with the section taken along a longitudinal center of the cylinder part of the bicycle control device, and with selected part shown in elevation.

In the embodiment described above, the adjustment bolt 35b of the adjustment mechanism 35 (i.e., the piston-position-adjusting mechanism 35A and the control lever position adjustment mechanism 35B) is disposed penetrating the support shaft 40 along the second axis X2, but the present invention is not limited to such a configuration. In a control device 212 according to a second modification, as shown in FIG. 12, an adjustment bolt 235b (an example of a second adjustment bolt, a fourth adjustment bolt, or a sixth adjustment bolt) serving as an adjustment member 235a (an example of a second adjustment member or a fourth adjustment member) of an adjustment mechanism 235 (constituted by a. piston-position-adjusting mechanism 235A and a control lever position adjustment mechanism 235B) is disposed near a lever shaft 26 having a first axis X1. The adjustment bolt 235b is screwed into a screw hole 236g formed in the lever 36b, and an end thereof contacts a coupling part 241b of a cam member 241. The second initial position of a first operating lever 236 is thus altered and the position of a piston 31 moves into the cylinder 30. The cam member 241 is biased in the clockwise direction in FIG. 12 by a first return spring 42a disposed on the cylinder 30. Here, there is no need for an adjustment bolt penetrating the interior of the support shaft 40 and coupling the second bracket 39 and the can member 241. The support member and the cam member may also be integrally formed. In such a case, there is also no need for an adjustment bolt penetrating the support. member.

Third Modification

Figure 13:
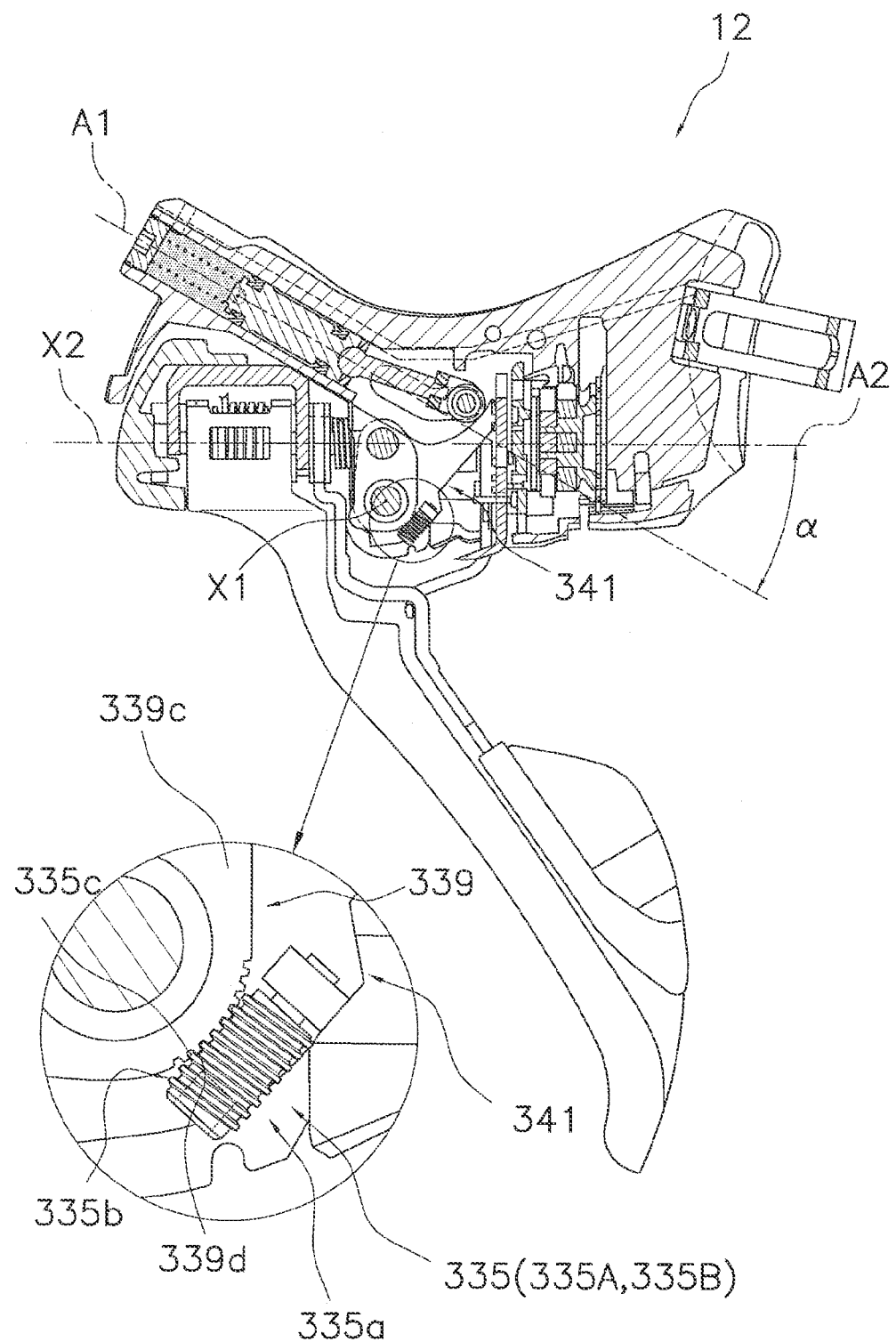
FIG. 13 is a cross sectional view of a bicycle control device according to a third modification of the bicycle control device illustrated in FIG. 3, with the section taken along a longitudinal center of the cylinder part of the bicycle control device, and with selected part shown in elevation.

In a control device 312 according to a third modification, as shown in FIG. 13, an adjustment member 335a (an example of a first adjustment member) of an adjustment mechanism 335 (constituted by a piston-position-adjusting mechanism 335A and a control lever position adjustment mechanism 335B) is constituted by a worm gear bolt 335b attached to a cam member 341. The worm gear bolt 335b has worm gear cogs 335c formed on an outer circumferential surface. Worm wheel cogs 339d meshing with the worm gear cogs 335c are formed on one of a pair of side plates 339c of a first bracket 339 of a support member 336a. In this case, the adjustment bolt of the embodiment described above is used as a coupling bolt for coupling a second bracket 339 of the control lever member 22 and a cam member 341.

Fourth Modification

Figure 14:
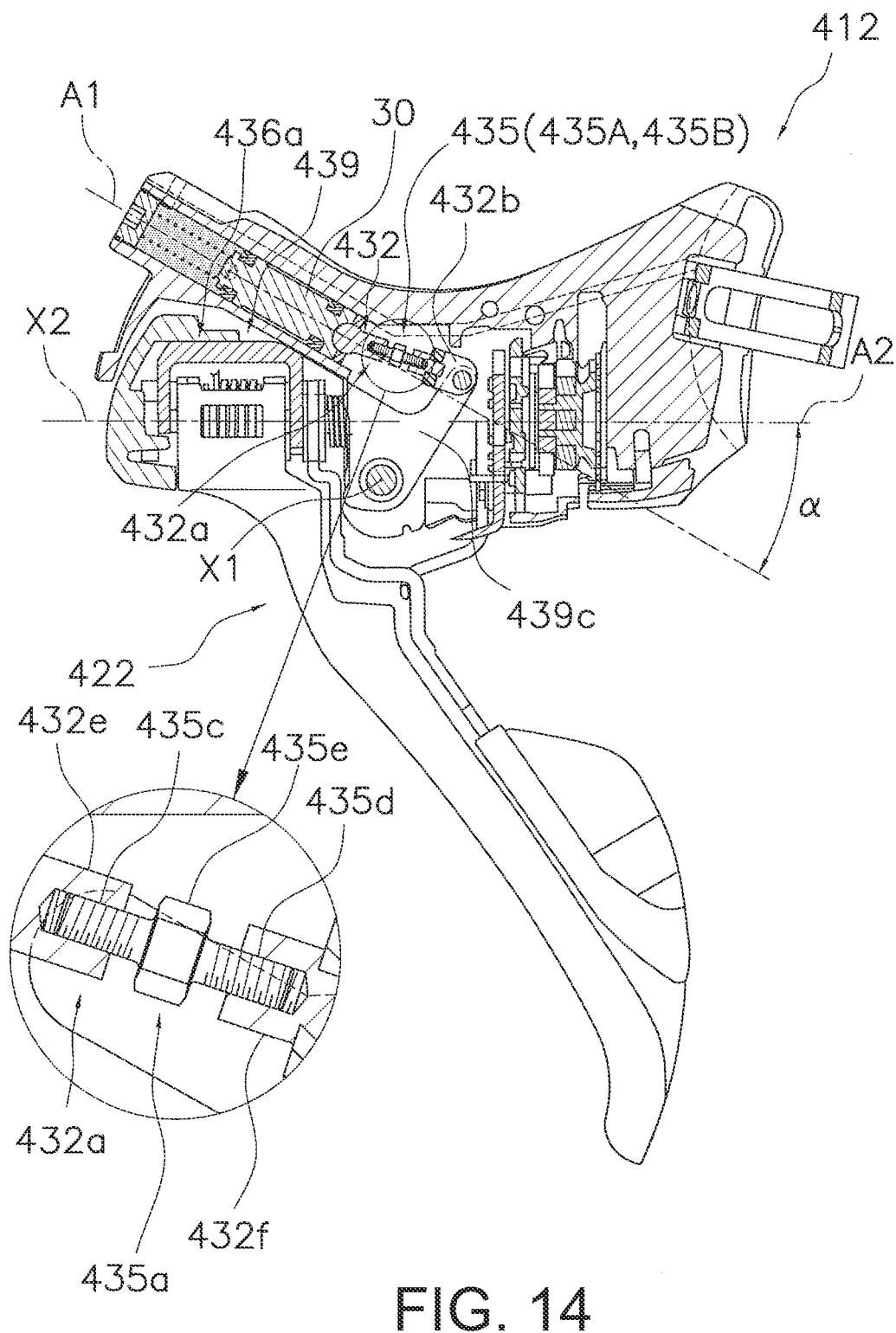
FIG. 14 is a cross sectional view of a bicycle control device according to a fourth modification of the bicycle control device illustrated in FIG. 3, with the section taken along a longitudinal center of the cylinder part of the bicycle control device, and with selected part shown in elevation.

In a control device 412 according to a fourth modification, as shown in FIG. 14, an adjustment mechanism 435 (constituted by a piston-position-adjusting mechanism 435A or a control lever position adjustment mechanism 435B) has an adjustment member 435a, capable of adjusting the relative positions of a control lever member 422 and a piston, and adapted for coupling the piston 31 and the control lever member 422. The adjustment member 435a is an example of a second adjustment member. Specifically, the piston 31 is coupled to a second bracket 439 of a support member 436a of a control lever member 422 via a rod part 432. Therefore, a cam member is not provided.

The rod part 432 does not have a roller, and side plates 439c of a second bracket 439 are pivotally coupled to a clevis pin 432b. A rod body 432a, has a first rod body 432e coupled to the cylinder 30, and a second rod body 432f disposed spaced apart from the first rod body 432e. The clevis pin 432b is disposed on the second rod body 432f. The adjustment member 435a has an adjustment screw 435b that screws into the first rod body 432e and the second rod body 432f and adjusts the length of the rod part 432. The rotation of the first rod body 432e around an axis is restricted.

The adjustment screw 435b has a first male screw 435c, a second male screw 435d and a rotatably operated noncircular grip part 435e. The first male screw 435c screws into the first rod body 432e. The second male screw 435d screws into the second rod body 432f. The rotatably operated noncircular grip part 435e is disposed between the first male screw 435c and the second male screw 435d. The rotatably operated noncircular grip part 435e can have, for example, a hexagonal shape. The first male screw 435c is, for example, a right-handed screw, and the second male screw 435d is, for example, a left-handed screw.

In the adjustment mechanism 435 (the piston-position-adjusting mechanism 435A or the control lever position adjustment mechanism 435B) having the configuration described above, the first rod body 432e and the second rod body 432f move toward each other, shortening the rod part 432, when the grip part 435e is turned by hand or using a tool in a first direction (for example, in a clockwise direction towards the piston). The first position of the piston 31 is thereby moved backwards (to the right in FIG. 14). When the grip part 435e is turned by hand or using a tool in a second direction, the first rod body 432e and the second rod body 432f move away from each other, lengthening the rod part 432. The first position of the piston 31 is thereby moved forwards (to the left in FIG. 14), This configuration also allows the first position of the piston 31 to be adjusted.

In the fourth modification, the piston-position-adjusting mechanism 435A or control lever position adjustment mechanism 435B is realized according to the magnitude of the biasing force of the first return spring 42a biasing the piston towards the first position and the second return spring 42b returning a control lever member 422 to the first initial position. Typically, the piston-position-adjusting mechanism 435A will be realized due to the larger magnitude of the biasing force of the second. return spring 42b. If the biasing force of the second return spring 42b is less that the biasing force of the first return spring 42a, the control lever position adjustment mechanism 435B will be realized.

Fifth Modification

Figure 15:
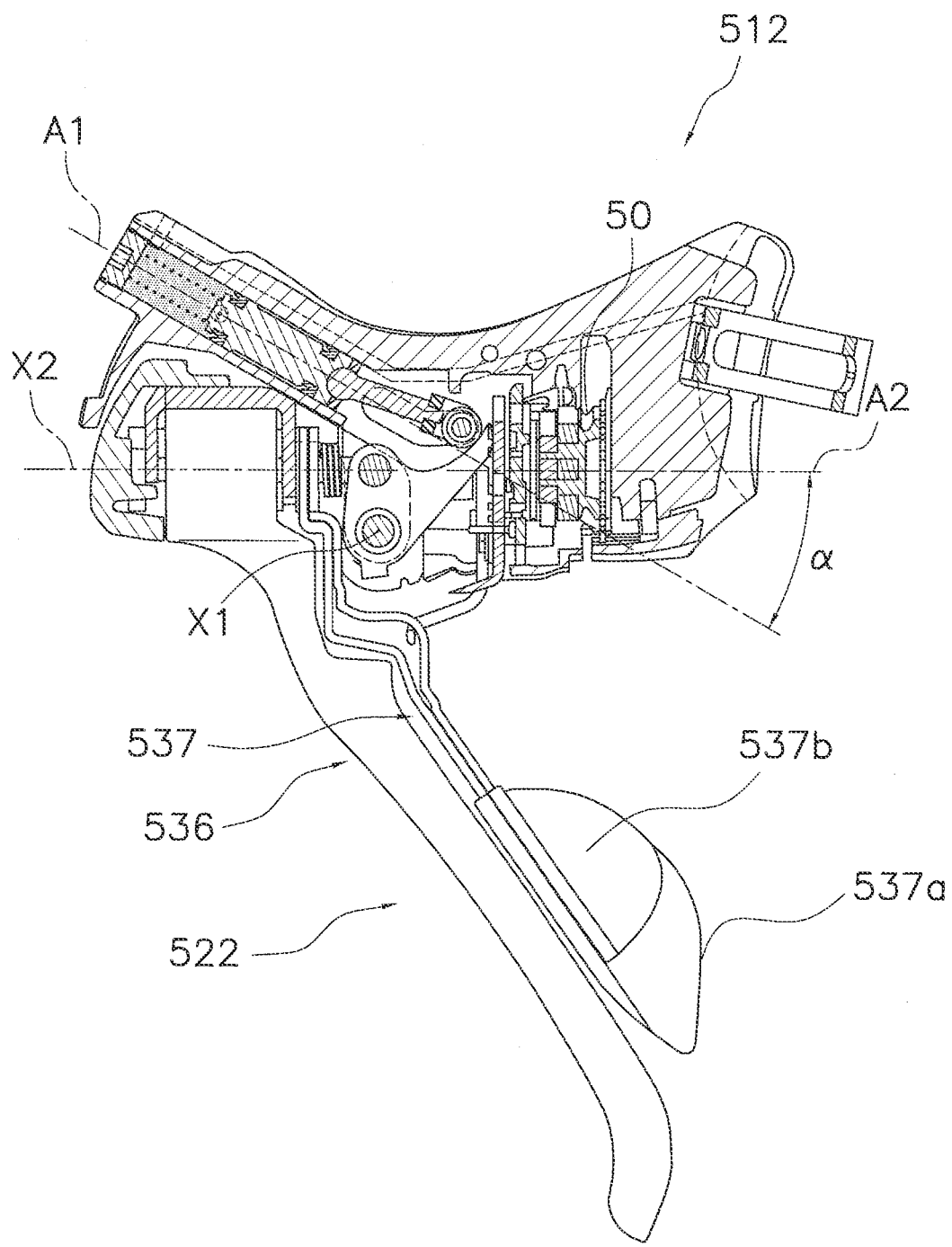
FIG. 15 is a cross sectional view of a bicycle control device according to a fifth modification of the bicycle control device illustrated in FIG. 3, with the section taken along a longitudinal center of the cylinder part of the bicycle control device, and with selected part shown in elevation.

In a control device 512, as shown in FIG. 15, a second operating lever 537 of a control lever member 522 has a take-up operating lever 537a and a release operating lever 537b. A first operating lever 536 pivots only around a first axis X1, and does not pivot around a second axis X2. The pivoting of the take-up operating lever 537a around the second axis X2 pivots the first input member 52, actuating the cable take-up member 50 in a take-up direction. The pivoting of the release operating lever 537b around the second axis X2 pivots the second input member 54, actuating the cable take-up member 50 in a release direction opposite the take-up direction.

Sixth Modification

Figure 16:
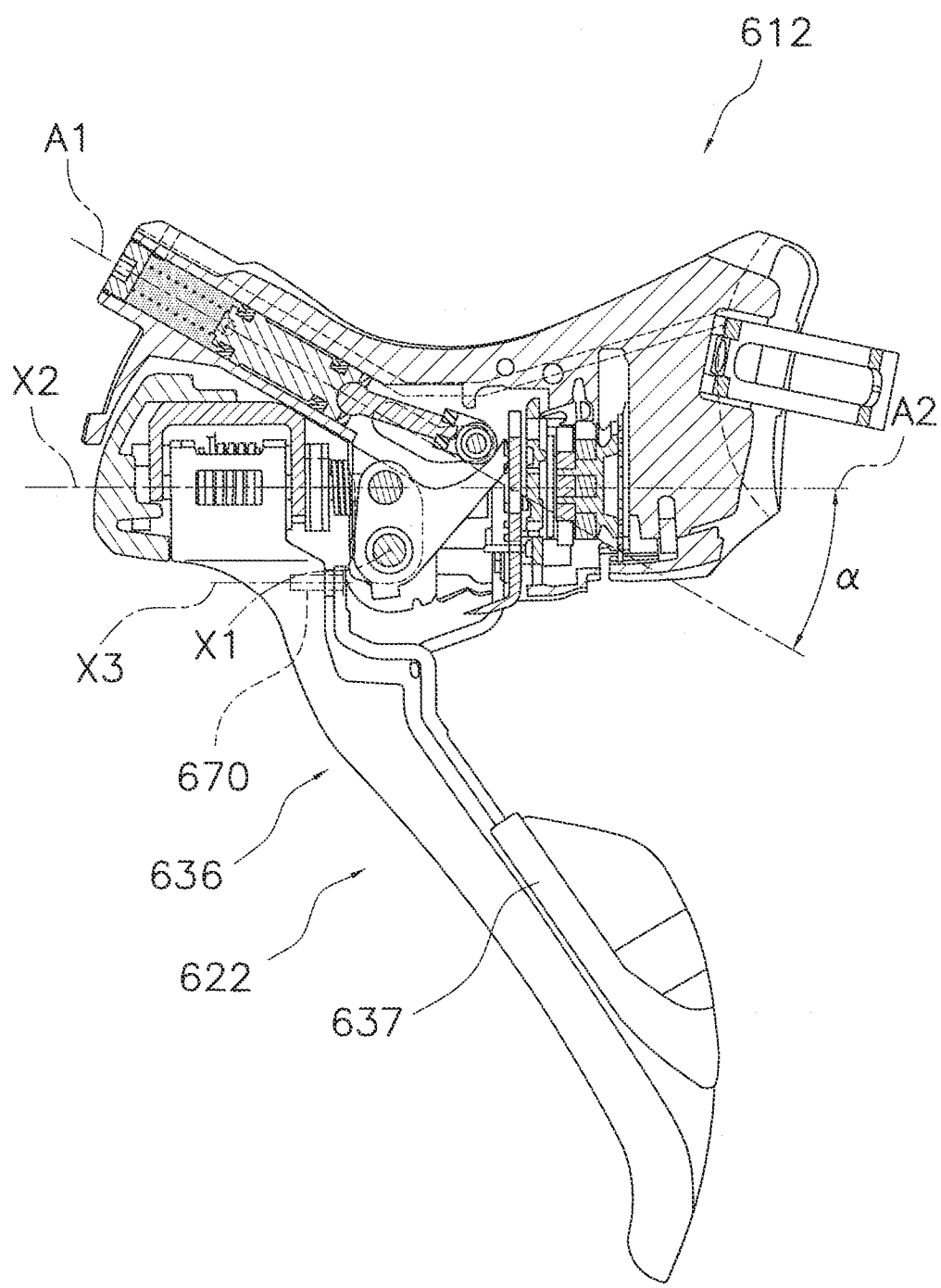
FIG. 16 is a cross sectional view of a bicycle control device according to a sixth modification of the bicycle control device illustrated in FIG. 3, with the section taken along a longitudinal center of the cylinder part of the bicycle control device, and with selected part shown in elevation.

In a control device 612, as shown in FIG. 16, a second operating lever 637 of a control lever member 622 pivots not around the second axis X2, but around a third axis X3 of a support shaft 670 disposed on a first operating lever 636 further towards a distal end than the second axis X2. The support shaft 670 is mounted to a first operating lever 636.

Other Embodiments

While the preceding modified embodiments primarily describe the piston position adjustment mechanism, comparable modifications and applications are possible for the control lever position adjustment mechanism as well. Embodiments of the present invention have been described above, but the present invention is not limited to these embodiments; various modifications are possible to the extent that they remain within the spirit of the invention. In particular, the various embodiments and modifications described in the present specification can be combined according to discretion as needed.

(a) In the embodiment described above, a disc brake device has been given as an example of a hydraulically actuated braking device, but the braking device controlled by the present invention is not limited to a disc brake device. The present invention can be applied to a control device for controlling any hydraulically actuated bicycle braking device. For example, the present invention can also be applied to a bicycle control device for controlling a braking device such as a hydraulically actuated caliper brake, drum brake, or the like.

(b) In the embodiment described above, a reservoir for storing hydraulic fluid for generating hydraulic pressure is provided, allowing hydraulic fluid to be injected into the cylinder when the level of hydraulic fluid in the cylinder decreases, and suppressing changes in braking characteristics regardless of changes in hydraulic fluid temperature, but the present invention can also be applied to a bicycle control device not having a reservoir.

(c) In the hydraulic fluid pressure generator 21 of the embodiment described above, hydraulic pressure is generated by pressing the piston 31, i.e., moving the piston 31 into the cylinder 30, but the present invention is not limited to such a configuration. For example, hydraulic pressure may be generated by pulling on the piston, i.e., drawing the piston out of the cylinder. In such a case, the pulling force acts only upon the rod part serving as a coupling part for the piston and the first operating lever. This prevents buckling from occurring in the rod part, allows the rigidity of the coupling part to be reduced, and decreases the weight of the rod part. However, in such a case, a force equivalent to the hydraulic pressure multiplied by the area of the rod subtracted from the area of the cylinder of the rod is generated, requiring a cylinder having a greater diameter than that of the embodiment described above.

Figure 17:
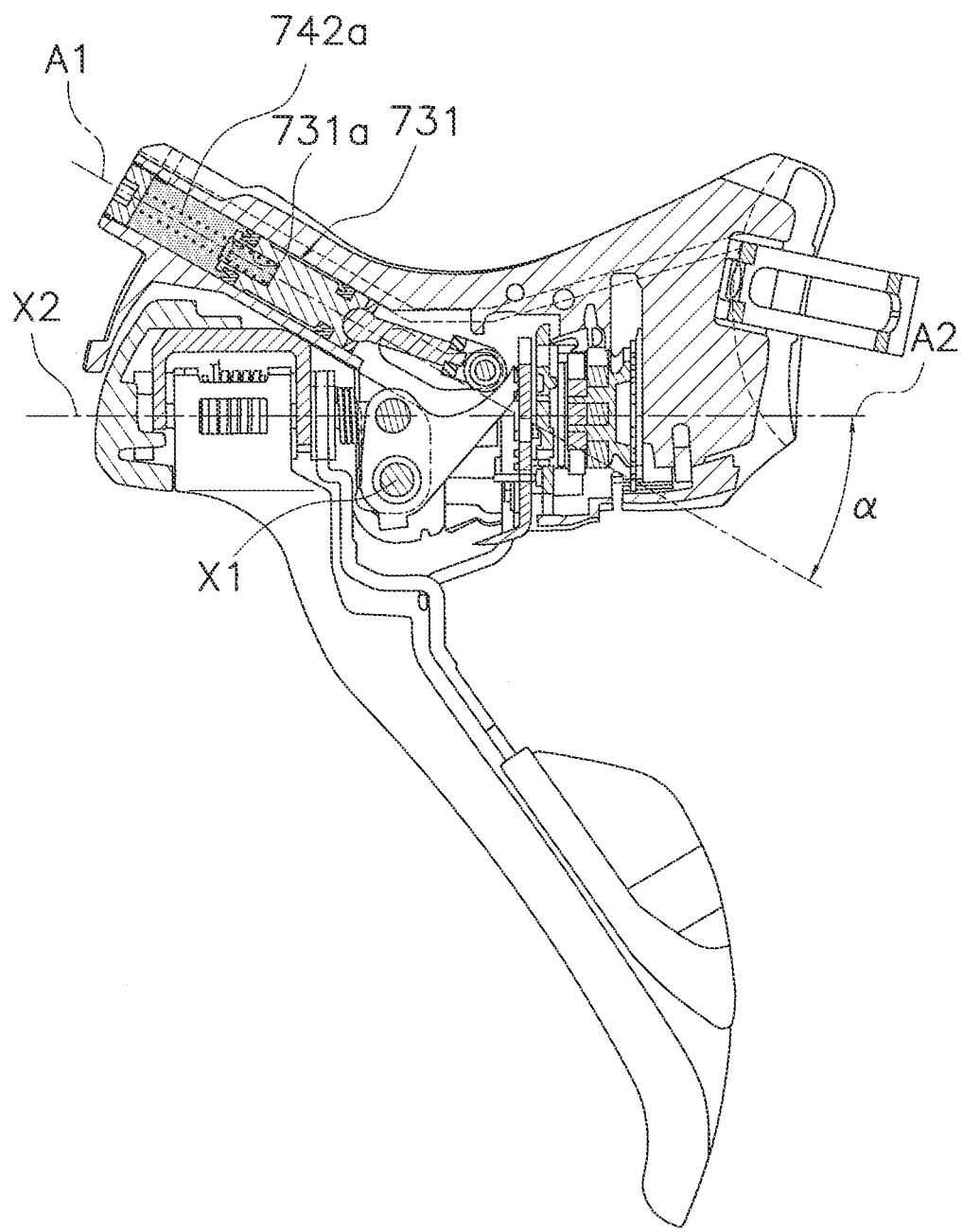
FIG. 17 is a cross sectional view, similar to FIG. 3, of a bicycle control device according to another embodiment, with the section taken along a longitudinal center of the cylinder part of the bicycle control device, and with selected part shown in elevation.

(d) In the embodiment described above, an end of the first return spring 42a contacts an end surface of the piston 31, but, as shown in FIG. 17, an end of a first return spring 742a may be housed within a housing hole 731a that is formed in a piston 731. This enables a space for housing the spring when the piston 731 returns to the second position to be easily ensured. A heightened degree of freedom in designing the spring is thus obtained.

(e) In the embodiment described above, the control lever member 22 is constituted by a first operating lever 36 for performing braking operations and shifting operations, and a second operating lever 37 for performing shifting operations. However, it is also acceptable to adopt a configuration in which a braking operation is performed by pivoting one operating lever around the first axis, a first shifting operation (for example, a downshift operation) is performed by pivoting the lever in one direction around a second axis, and a second shifting operation (for example, an upshift operation) is performed by pivoting the lever in the other direction around the second axis.

(f) In the embodiment described above, a first return spring 42a and a second return spring 42b are provided on the first operating lever 36 and the hydraulic fluid pressure generator 21, but it is also acceptable to provide only a first return spring 42a. If a cam member and a roller are not provided and the second bracket is directly coupled to the rod part, it is acceptable to provide only one of the first return spring or the second return spring.

(g) In the embodiment described above, a hydraulic pressure tube 34f is used as the second hydraulic fluid channel 34c in FIG. 5, but an interior hydraulic pressure hose 34h passing through the tube hole 34e or between the cover member 25 and the main grip body 24 may also be used. It is also possible to form a hole in the grip part 20b for creating a second hydraulic fluid channel. In such cases, the end of the hole must be sealed by a plug.

As used herein, the following directional terms "forward", "rearward", "front", "rear", "up", "down", "above", "below", "upward", "downward", "top", "bottom", " side", "vertical", "horizontal", "perpendicular" and "transverse" as well as any other similar directional terms refer to those directions of a bicycle in an upright, riding position and equipped with the control device 12. Accordingly, these directional terms, as utilized to describe the control device 12 should be interpreted relative to a bicycle in an upright riding position on a horizontal surface and that is equipped with the bicycle control device 12. The terms "left" and "right" are used to indicate the "right" when referencing from the right side as viewed from the rear of the bicycle, and the "left" when referencing from the left side as viewed from the rear of the bicycle. Finally, terms of degree such as "substantially", "about" and "approximately" as used herein mean an amount of deviation of the modified term such that the end result is not significantly changed. These terms can be construed as including a deviation of ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
    a housing member having an attachment part configured to be attached to a handlebar, and a grip part extending longitudinally between a first end of the grip part and a second end of the grip part, the attachment part being provided on the first end of the grip part;
    a control lever member pivotally provided with respect to the housing member;
    a shift-operating mechanism provided in the housing member, the shift-operating mechanism configured to be coupled to a shifting device by a control cable; and
    a hydraulic fluid pressure generator having a cylinder, a piston movably disposed within the cylinder by movement of the control lever member to generate fluid pressure for controlling a braking device, a piston position adjustment mechanism adjustably coupling an operating lever of the control lever member to the piston, the piston position adjustment mechanism being configured to change an initial position of the piston with respect to the cylinder.

2. A bicycle control device comprising:
a housing member having an attachment part configured to be attached to a handlebar, and a grip part extending longitudinally between a first end of the grip part and a second end of the grip part, the attachment part being provided on the first end of the grip part;
a control lever member pivotally provided with respect to the housing member, the control lever member having a first operating lever, and a cam member for pivoting about a first axis in conjunction with pivoting of the first operating lever, and actuating the rod part;
a shift-operating mechanism provided in the housing member, the shift-operating mechanism configured to be coupled to a shifting device by a control cable; and
a hydraulic fluid pressure generator having a cylinder, a piston movably disposed within the cylinder by movement of the control lever member to generate fluid pressure for controlling a braking device, a rod part coupled to the piston, the rod part being operated by the control lever member, a piston position adjustment mechanism adjustably coupling the piston with respect to the cylinder to change an initial position of the piston with respect to the cylinder,
the piston position adjustment mechanism having a first adjustment member coupled to the cam member for adjusting the initial position of the cam member.

3. The bicycle control device according to claim 2, wherein
the first adjustment member has a first adjustment bolt disposed along a second axis that is spaced from the first axis.

4. The bicycle control device according to claim 2, wherein
the first adjustment member has a second adjustment bolt provided in proximity to the first axis.

5. The bicycle control device according to claim 2, wherein
the first adjustment member has a worm gear bolt that is provided to one of the first operating lever part and the cam member, and that is configured to engage the other of the first operating lever part and the cam member.

6. The bicycle control device according to claim 1, wherein
the piston position adjustment mechanism has a second adjustment member for coupling the control lever member and the piston, and the second adjustment member being configured to adjust a position of the control lever member relative to the piston.

7. The bicycle control device according to claim 6, wherein
the hydraulic fluid pressure generator has a rod part coupled to the piston, and operated by the control lever member; and
the second adjustment member has an adjustment screw that adjusts an effective length of the rod part.

8. A bicycle control device comprising:
a housing member having an attachment part configured to be attached to a handlebar, and a grip part extending longitudinally between a first end of the grip part and a second end of the grip part, the attachment part being provided on the first end of the grip part;
a control lever member pivotally provided with respect to the housing member about a first axis;
a shift-operating mechanism provided in the housing member, the shift-operating mechanism configured to be coupled to a shifting device by a control cable;
a hydraulic fluid pressure generator having a cylinder provided in the housing member, a piston movably disposed within the cylinder by movement of the control lever member to generate fluid pressure for controlling a braking device, the cylinder being disposed in the housing member at a position closer toward the second end of the grip part than is the shift-operating mechanism to the second end of the grip part; and
an adjustment mechanism adjustably coupling the control lever member to the piston, the adjustment mechanism being configured to change an initial position of the control lever member with respect to the housing member.

9. The bicycle control device according to claim 8, wherein
the adjustment mechanism has a first adjustment member coupled to the control lever member for adjusting the initial position of the control lever member.

10. The bicycle control device according to claim 9, wherein
the first adjustment member has an adjustment bolt that is disposed along a second axis that is spaced from the first axis.

11. The bicycle control device according to claim 9, wherein
the first adjustment member has an adjustment bolt provided in proximity to the first axis.

12. The bicycle control device according to claim 9, wherein
the adjustment mechanism further includes a second adjustment member having a worm gear bolt that is provided to the control lever member.

13. A bicycle control device comprising:
a housing member having an attachment part configured to be attached to a handlebar, and a grip part extending longitudinally between a first end of the grip part and a second end of the grip part, the attachment part being provided on the first end of the grip part;
a control lever member pivotally provided with respect to the housing member about a first axis;
a shift-operating mechanism provided in the housing member, the shift-operating mechanism configured to be coupled to a shifting device by a control cable;
a hydraulic fluid pressure generator having a cylinder provided in the housing member, a piston movably disposed within the cylinder by movement of the control lever member to generate fluid pressure for controlling a braking device, the cylinder being disposed in the housing member at a position closer toward the second end of the grip part than is the shift-operating mechanism to the second end of the grip part, the hydraulic fluid pressure generator having a rod part that is coupled to the piston and that is operated by the control lever member;
a control lever position adjustment mechanism adjustably coupling the control lever member with respect to the housing member to change an initial position of the control lever member with respect to the housing member, the control lever member having a cam member for pivoting about the first axis in conjunction with pivoting of the control lever member, actuating the rod part; and an adjustment member coupled to the cam member and to the control lever member for adjusting the initial position of the control lever member and an initial position of the cam member.

14. The bicycle control device according to claim 13, wherein
the adjustment member has an adjustment bolt dispose along a second axis that is spaced from the first axis.

15. The bicycle control device according to claim 13, wherein
the adjustment member has an adjustment bolt provided in proximity to the first axis.

16. The bicycle control device according to claim 13, wherein
the adjustment member has a worm gear bolt that is provided on one of the control lever member and the cam member, and that engages the other of the control lever member and the cam member.

17. The bicycle control device according to claim 1, wherein
the piston position adjustment mechanism includes an adjustment member that adjustably couples the control lever member to the piston and an adjustment bolt that penetrates the operating lever.

* * * * *